US012563218B2

(12) United States Patent (10) Patent No.: US 12,563,218 B2
Yasugi et al. (45) Date of Patent: Feb. 24, 2026

(54) VIDEO CODING APPARATUS AND VIDEO DECODING APPARATUS

(71) Applicant: Sharp Kabushiki Kaisha, Sakai (JP)

(72) Inventors: Yukinobu Yasugi, Sakai (JP); Keiichiro Takada, Sakai (JP); Tomohiro Ikai, Sakai (JP); Takeshi Chujoh, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/727,398

(22) PCT Filed: Jan. 11, 2023

(86) PCT No.: PCT/JP2023/000408
§ 371 (c)(1),
(2) Date: Jul. 9, 2024

(87) PCT Pub. No.: WO2023/136257
PCT Pub. Date: Jul. 20, 2023

(65) Prior Publication Data
US 2025/0097443 A1 Mar. 20, 2025

(30) Foreign Application Priority Data

Jan. 14, 2022 (JP) ................................. 2022-004115

(51) Int. Cl.
*H04N 19/44* (2014.01)
*H04N 19/42* (2014.01)
*H04N 19/80* (2014.01)
(52) U.S. Cl.
CPC ............. *H04N 19/44* (2014.11); *H04N 19/42* (2014.11); *H04N 19/80* (2014.11)

(58) Field of Classification Search
CPC .... H04N 19/117; H04N 19/186; H04N 19/42; H04N 19/44; H04N 19/46; H04N 19/463;
(Continued)

(56) References Cited

U.S. PATENT DOCUMENTS

2020/0301994 A1* 9/2020 Dikici ................... G06F 17/153
2022/0222541 A1* 7/2022 Matlage ................... G06N 3/08
(Continued)

OTHER PUBLICATIONS

Official Communication issued in International Patent Application No. PCT/JP2023/000408, mailed on Mar. 28, 2023, 4 pages.
(Continued)

*Primary Examiner* — Shahan Ur Rahaman
(74) *Attorney, Agent, or Firm* — Keating & Bennett, LLP

(57) ABSTRACT

A problem with known SEI is that a relationship between a target image and an input tensor of a neural network model and a relationship between an output tensor and an output image are undefined or insufficient, and thus processing cannot be performed by simply using a model. Another problem is that in a case that the color component of the output image and the color component of the target image are different from each other, processing cannot be performed. An aspect of the present invention provides a video decoding apparatus including a prediction image derivation unit configured to decode a prediction image, and a residual decoder configured to decode a residual, wherein an input tensor is derived from a parameter indicating the number of channels of the input tensor and the output tensor of the neural network model or an image is derived from the output tensor.

1 Claim, 20 Drawing Sheets

(58) Field of Classification Search
CPC ........ H04N 19/50; H04N 19/70; H04N 19/80;
H04N 19/82; H04N 19/85; H04N 19/86
See application file for complete search history.

(56) References Cited

U.S. PATENT DOCUMENTS

2022/0337857 A1* 10/2022 Choi ...................... H04N 19/70
2022/0385911 A1* 12/2022 Ferrara .................. H04N 19/61
2023/0252273 A1* 8/2023 Racape ................ G06N 3/0495
706/15

OTHER PUBLICATIONS

Yasugi et al., "AHG9: Data conversion description for NNR post-filter SEI message", Joint Video Experts Team (JVET) of ITU-T SG 16 WP 3 and ISO/IEC JTC 1/SC 29, JVET-Y0074-v1, Jan. 12-21, 2022, pp. 1-6.
Hannuksela et al., "AHG9: On post-filter SEI", Joint Video Experts Team (JVET) of ITU-T SG 16 WP 3 and ISO/IEC JTC 1/SC 29, JVET-Y0115-v1, Jan. 12-21, 2022, pp. 1-7.
Hannuksela et al., "AHG9: On post-filter SEI", Joint Video Experts Team (JVET) of ITU-T SG 16 WP 3 and ISO/IEC JTC 1/SC 29, JVET-X0112-v1, Oct. 6-15, 2021, pp. 1-5.
Choi et al., "AHG9/AHG11: SEI messages for carriage of neural network information for postfiltering", Joint Video Experts Team (JVET) of ITU-T SG 16 WP 3 and ISO/IEC JTC 1/SC 29, JVET-V0091-v2, Apr. 20-28, 2021, pp. 1-15.

* cited by examiner

| nnr_post_filter( payloadSize ) { | Descriptor |
|---|---|
| nnrpf_id | u(21) |
| nnrpf_mode_idc | u(2) |
| if( nnrpf_mode_idc > 0 ){ | |
| nnrpf_persistence_flag | u(1) |
| nnrpf_parameter_type_idc | u(4) |
| nnrpf_num_parameters_idc | ue(v) |
| nnrpf_operation_type_idc | u(4) |
| nnrpf_num_kmac_operations_idc | ue(v) |
| while( !byte_aligned( ) ) | |
| nnrpf_alignment_zero_bit /* equal to 0 */ | f(1) |
| } | |
| if( nnrpf_mode_idc == 1 ) { | |
| i = 0 | |
| do { | |
| nnrpf_uri[ i ] | b(8) |
| while( nnrpf_uri[ i++ ] != 0 ) | |
| } | |
| if( nnrpf_mode_idc == 2 \|\| nnrpf_mode_idc == 3 ) { | |
| for( i = 0; i < payloadSize - 3 ; i++ ) | |
| nnrpf_payload_byte[ i ] | b(8) |
| } | |
| } | |

FIG. 7

| nnr_post_filter( payloadSize ) { | Descriptor |
|---|---|
| nnrpf_id | u(21) |
| nnrpf_mode_idc | u(2) |
| if( nnrpf_mode_idc > 0 ){ | |
| nnrpf_persistence_flag | u(1) |
| nnrpf_parameter_type_idc | u(2) |
| nnrpf_parameter_bit_width_idc | u(2) |
| nnrpf_num_parameters_idc | ue(v) |
| nnrpf_operation_type_idc | u(4) |
| nnrpf_num_kmac_operations_idc | ue(v) |
| while( !byte_aligned( ) ) | |
| nnrpf_alignment_zero_bit /* equal to 0 */ | f(1) |
| } | |
| if( nnrpf_mode_idc == 1 ) { | |
| i = 0 | |
| do { | |
| nnrpf_uri[ i ] | b(8) |
| while( nnrpf_uri[ i++ ] != 0 ) | |
| } | |
| if( nnrpf_mode_idc == 2 \|\| nnrpf_mode_idc == 3 ) { | |
| for( i = 0; i < payloadSize - 3 ; i++ ) | |
| nnrpf_payload_byte[ i ] | b(8) |
| } | |
| } | |

FIG. 8

| nnr_post_filter( payloadSize ) { | Descriptor |
|---|---|
| nnrpf_id | u(21) |
| nnrpf_mode_idc | u(2) |
| if( nnrpf_mode_idc > 0 ){ | |
| nnrpf_persistence_flag | u(1) |
| nnrpf_parameter_type_idc | u(2) |
| nnrpf_log2_parameter_bit_width_minus_3 | u(2) |
| nnrpf_num_parameters_idc | ue(v) |
| nnrpf_operation_type_idc | u(4) |
| nnrpf_num_kmac_operations_idc | ue(v) |
| while( !byte_aligned( ) ) | |
| nnrpf_alignment_zero_bit /* equal to 0 */ | f(1) |
| } | |
| if( nnrpf_mode_idc = = 1 ) { | |
| i = 0 | |
| do { | |
| nnrpf_uri[ i ] | b(8) |
| while( nnrpf_uri[ i++ ] != 0 ) | |
| } | |
| if( nnrpf_mode_idc = = 2 \|\| nnrpf_mode_idc = = 3 ) { | |
| for( i = 0; i < payloadSize - 3 ; i++ ) | |
| nnrpf_payload_byte[ i ] | b(8) |
| } | |
| } | |

FIG. 9

| post_filter_purpose( payloadSize ) { | Descriptor |
|---|---|
| pfp_id | u(21) |
| pfp_purpose | ue(v) |
| if( pfp_purpose == 1 ) { /* super resolution */ | |
| pfp_pic_width_in_luma_samples | ue(v) |
| pfp_pic_height_in_luma_samples | ue(v) |
| } else if (pfp_purpose == 2 ) { /* conversion of chroma format */ | |
| pfp_component_id | u(2) |
| pfp_output_diff_chroma_format_idc | u(2) |
| } | |
| } | |

FIG. 11

(a) LOOP FILTER
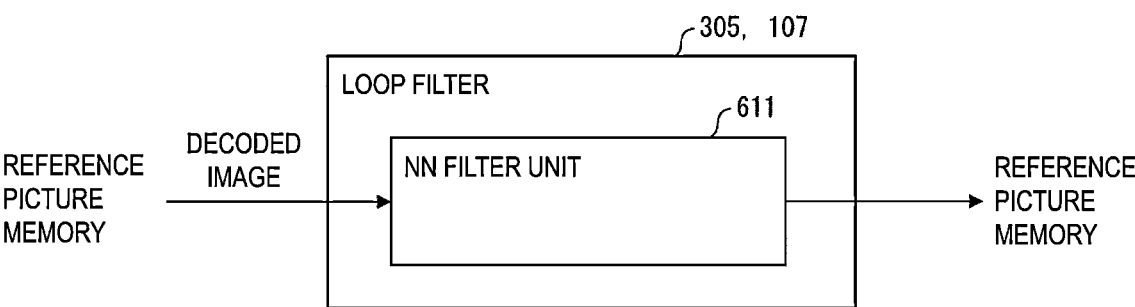
(b) PREDICTION IMAGE FILTER
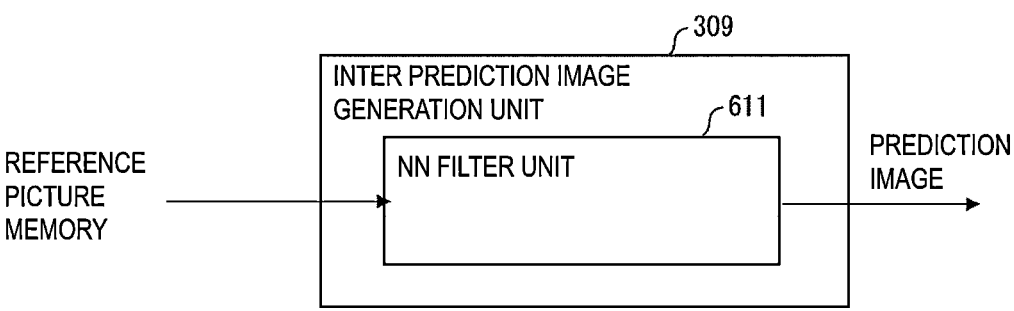
(c) POST-FILTER
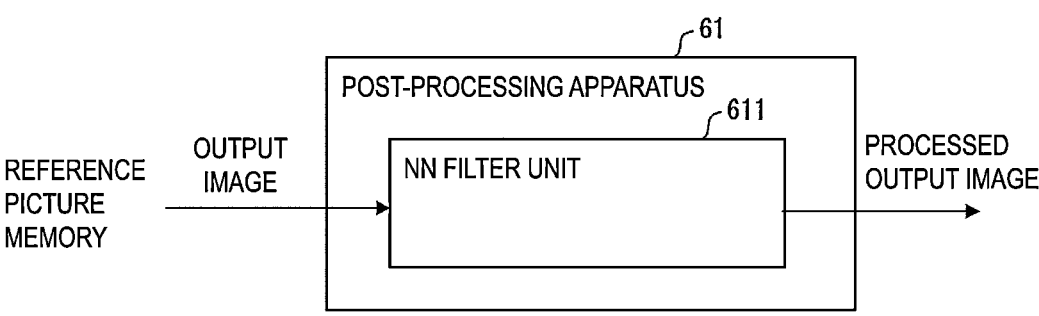
FIG. 12

| nnr_post_filter( payloadSize ) { | Descriptor |
|---|---|
| nnrpf_id | u(21) |
| nnrpf_mode_idc | u(2) |
| if( nnrpf_mode_idc > 0 ) | |
| nnrpf_persistence_flag | u(1) |
| nnrpf_input_format_idc | u(4) |
| nnrpf_output_format_idc | u(4) |
| if( nnrpf_mode_idc == 1 ) { | |
| i = 0 | |
| do { | |
| nnrpf_uri[ i ] | b(8) |
| while( nnrpf_uri[ i++ ] != 0 ) | |
| } | |
| if( nnrpf_mode_idc == 2 \|\| nnrpf_mode_idc == 3 ) { | |
| for( i = 0; i < payloadSize − 3 ; i++ ) | |
| nnrpf_payload_byte[ i ] | b(8) |
| } | |
| } | |

FIG. 14

| nnrpf_input_format_idc | Number of channels | Data format |
|---|---|---|
| 0 | 1 | 3D tensor (C, H, W) |
| 1 | 2 | 3D tensor (C, H, W) |
| 2 | 3 | 3D tensor (C, H, W) |
| 3 | 6 | 3D tensor (C, H, W) |
| 4..7 | - | Reserved |

FIG. 15

| nnrpf_output_format_idc | Number of channels | Data format |
|---|---|---|
| 0 | 1 | 3D tensor (C, H, W) |
| 1 | 2 | 3D tensor (C, H, W) |
| 2 | 3 | 3D tensor (C, H, W) |
| 3 | 6 | 3D tensor (C, H, W) |
| 4..7 | - | Reserved |

FIG. 16

| nnrpf_input_format_idc | Conversion process |
|---|---|
| 0 | inputTensor[0][y][x] = ComponentSample[ 0 ][x][y] |
| 1 | inputTensor[0][cy][cx] = ComponentSample[ 1 ][cx][cy] <br><br> inputTensor[1][cy][cx] = ComponentSample[ 2 ][cx][cy] |
| 2 | SW=SubWidthC <br><br> SH=SubHeightC <br><br> inputTensor[ 0 ][y][x] = ComponentSample[ 0 ][x][y] <br><br> inputTensor[ 1 ][y][x] = ComponentSample[ 1 ] [x/SW][y/SH] <br><br> inputTensor[ 2 ][y][x] = ComponentSample[ 2 ] [x/SW][y/SH] |
| 3 | inputTensor[ 0 ][cy][cx] = ComponentSample[ 0 ][cx*2][cy*2] <br><br> inputTensor[ 1 ][cy][cx] = ComponentSample[ 0 ][cx*2+1][cy*2] <br><br> inputTensor[ 2 ][cy][cx] = ComponentSample[ 0 ][cx*2][cy*2+1] <br><br> inputTensor[ 3 ][cy][cx] = ComponentSample[ 0 ][cx*2+1][cy*2+1] <br><br> inputTensor[ 4 ][cy][cx] = ComponentSample[ 1 ][cx][cy] <br><br> inputTensor[ 5 ][cy][cx] = ComponentSample[ 2 ][cx][cy] |
| 4..15 | Reserved |

FIG. 17

| nnrpf_output_format_idc | Conversion |
|---|---|
| 0 | outSamplesL[x][y] = outputTensor[ 0 ][y][x] |
| 1 | outSamplesCb[cx][cy] = outputTensor[ 0 ][cy][cx]<br><br>outSamplesCr[cx][cy] = outputTensor[ 1 ][cy][cx] |
| 2 | outSamplesL[x][y] = outputTensor[ 0 ][y][x]<br><br>outSamplesCb[cx][cy] = outputTensor[ 1 ][cy*outSH][cx*outSW]<br><br>outSamplesCr[cx][cy] = outputTensor[ 2 ][cy*outSH][cx*outSW] |
| 3 | outSamplesL[x/2*2][y/2*2] = outputTensor[ 0 ][y/2][x/2]<br><br>outSamplesL[x/2*2+1][y/2*2] = outputTensor[ 1 ][y/2][x/2]<br><br>outSamplesL[x/2*2][y/2*2+1] = outputTensor[ 2 ][y/2][x/2]<br><br>outSamplesL[x/2*2+1][y/2*2+1]= outputTensor[ 3 ][y/2][x/2]<br><br>outSamplesCb[cx][cy] = outputTensor[ 4 ][cy*outSH][cx*outSW]<br><br>outSamplesCr[cx][cy] = outputTensor[ 5 ][cy*outSH][cx*outSW] |

FIG. 18

| nnr_post_filter( payloadSize ) { | Descriptor |
|---|---|
| nnrpf_id | u(21) |
| nnrpf_mode_idc | u(2) |
| if( nnrpf_mode_idc > 0 ) { | |
| nnrpf_persistence_flag | u(1) |
| if( nnrpf_mode_idc == 1 \|\| nnrpf_mode_idc == 2 ) { | |
| nnrpf_purpose | ue(v) |
| nnrpf_io_idc | ue(v) |
| nnrpf_patch_size_minus1 | ue(v) |
| nnrpf_overlap | ue(v) |
| nnrpf_additional_info_idc | ue(v) |
| while( !byte_aligned( ) ) | |
| nnrpf_reserved_zero_bit | u(1) |
| } | |
| if( nnrpf_mode_idc == 1 ) { | |
| i = 0 | |
| do | |
| nnrpf_uri[ i ] | b(8) |
| while( nnrpf_uri[ i++ ] != 0 ) | |
| } | |
| if( nnrpf_mode_idc == 2 \|\| nnrpf_mode_idc == 3 ) { | |
| for( i = 0; more_data_in_payload( ); i++ ) | |
| nnrpf_payload_byte[ i ] | b(8) |
| } | |
| } | |
| } | |

FIG. 19

| nnrpf_input_format_idc | Number of channels (=NumInChannels) | 1 |
|---|---|---|
| 0 | 1 | inputTensor[0][y][x] = ComponentSample[ 0 ][x][y] |
| 1 | 2 | inputTensor[0][cy][cx] = ComponentSample[ 1 ][cx][cy]<br><br>inputTensor[1][cy][cx] = ComponentSample[ 2 ][cx][cy] |
| 2 | 3 | SW=SubWidthC<br><br>SH=SubHeightC<br><br>inputTensor[ 0 ][y][x] = ComponentSample[ 0 ][x][y]<br><br>inputTensor[ 1 ][y][x] = ComponentSample[ 1 ] [x/SW][y/SH]<br><br>inputTensor[ 2 ][y][x] = ComponentSample[ 2 ] [x/SW][y/SH] |
| 3 | 4 | inputTensor[ 0 ][cy][cx] = ComponentSample[ 0 ][cx*2][cy*2]<br><br>inputTensor[ 1 ][cy][cx] = ComponentSample[ 0 ][cx*2][cy*2+1]<br><br>inputTensor[ 2 ][cy][cx] = ComponentSample[ 1 ][cx][cy]<br><br>inputTensor[ 3 ][cy][cx] = ComponentSample[ 2 ][cx][cy] |
| 4 | 6 | inputTensor[ 0 ][cy][cx] = ComponentSample[ 0 ][cx*2][cy*2]<br><br>inputTensor[ 1 ][cy][cx] = ComponentSample[ 0 ][cx*2+1][cy*2]<br><br>inputTensor[ 2 ][cy][cx] = ComponentSample[ 0 ][cx*2][cy*2+1]<br><br>inputTensor[ 3 ][cy][cx] = ComponentSample[ 0 ][cx*2+1][cy*2+1]<br><br>inputTensor[ 4 ][cy][cx] = ComponentSample[ 1 ][cx][cy]<br><br>inputTensor[ 5 ][cy][cx] = ComponentSample[ 2 ][cx][cy] |
| 4..15 | | Reserved |

| nnrpf_output_format_idc | Number of channels (=NumOutChannels) | Conversion |
|---|---|---|
| 0 | 1 | outSamplesL[x][y] = outputTensor[ 0 ][y][x] |
| 1 | 2 | outSamplesCb[cx][cy] = outputTensor[ 0 ][cy][cx]<br><br>outSamplesCr[cx][cy] = outputTensor[ 1 ][cy][cx] |
| 2 | 3 | outSamplesL[x][y] = outputTensor[ 0 ][y][x]<br><br>outSamplesCb[cx][cy] = outputTensor[ 1 ][cy*outSH][cx*outSW]<br><br>outSamplesCr[cx][cy] = outputTensor[ 2 ][cy*outSH][cx*outSW] |
| 3 | 4 | outSamplesL[x/2*2][y/2*2] = outputTensor[ 0 ][y/2][x/2]<br><br>outSamplesL[x/2*2+1][y/2*2] = outputTensor[ 1 ][y/2+1][x/2]<br><br>outSamplesCb[cx][cy] = outputTensor[ 2 ][cy*outSH][cx*outSW]<br><br>outSamplesCr[cx][cy] = outputTensor[ 3 ][cy*outSH][cx*outSW] |
| 4 | 6 | outSamplesL[x/2*2][y/2*2] = outputTensor[ 0 ][y/2][x/2]<br><br>outSamplesL[x/2*2+1][y/2*2] = outputTensor[ 1 ][y/2][x/2]<br><br>outSamplesL[x/2*2][y/2*2+1] = outputTensor[ 2 ][y/2][x/2]<br><br>outSamplesL[x/2*2+1][y/2*2+1]= outputTensor[ 3 ][y/2][x/2]<br><br>outSamplesCb[cx][cy] = outputTensor[ 4 ][cy*outSH][cx*outSW]<br><br>outSamplesCr[cx][cy] = outputTensor[ 5 ][cy*outSH][cx*outSW] |

FIG. 20

VIDEO CODING APPARATUS AND VIDEO DECODING APPARATUS

TECHNICAL FIELD

Embodiments of the present invention relate to a video coding apparatus and a video decoding apparatus.

BACKGROUND ART

A video coding apparatus which generates coded data by coding a video, and a video decoding apparatus which generates decoded images by decoding coded data are used for efficient transmission or recording of videos.

Specific video coding schemes include H.264/AVC and H.265/High-Efficiency Video Coding (HEVC) schemes.

In such video coding schemes, images (pictures) constituting a video are managed in a hierarchical structure including slices obtained by splitting an image, Coding Tree Units (CTUs) obtained by splitting a slice, Coding Units (CUs) obtained by splitting a coding tree unit, and Transform Units (TUs) obtained by splitting a coding unit, and are coded/decoded for each CU.

In such video coding schemes, usually, a prediction image is generated based on a locally decoded image that is obtained by coding/decoding an input image, and a prediction error (which may be referred to also as a "difference image" or a "residual image") obtained by subtracting the prediction image from the input image (source image) is coded. Generation methods of prediction images include inter picture prediction (inter prediction) and intra picture prediction (intra prediction).

In addition, NPL 1 introduces an example of recent technology for video coding and decoding.

In H.274, supplemental enhancement information SEI for transmitting image properties, display method, timing, and the like simultaneously with coded data is defined.

NPL 1, NPL 2, and NPL 3 disclose a method of explicitly defining SEI for transmitting a topology and a parameter of a neural network filter used as a post filter and a method of indirectly defining the SEI as reference information.

CITATION LIST

Non Patent Literature

NPL 1: B. Choi, Z. Li, W. Wang, W. Jiang, X. Xu, S. Wenger and S. Liu, "AHG9/AHG11: SEI messages for carriage of neural network information for post-filtering," JVET-V0091

NPL 2: M. M. Hannuksela, E. B. Aksu, F. Cricri, H. R. Tavakoli and M. Santamaria, "AHG9: On post-filter SEI", JVET-X0112

NPL 3: M. M. Hannuksela, M. Santamaria, F. Cricri, E. B. Aksu and H. R. Tavakoli, "AHG9: On post-filter SEI", JVET-Y0115

SUMMARY OF INVENTION

Technical Problem

However, NPL 1 and NPL 2 both pose the problem that the input and output of post-filter processing are not explicitly defined.

NPL 2 poses the problem that NPL 2 does not specify a color space of output or chroma sub-sampling, preventing specification of what output is obtained from additional information.

NPL 1 and NPL 2 enable analysis of the types of tensors of input and output from the topology of the neural network, but do not allow the relationship between channels and color components of the tensors to be specified. For example, NPL 1 and NPL 2 fail to define how to configure a luma channel and a chroma channel in the input tensor and what color space the processed output tensor is output with. Therefore, NPL 1 and NPL 2 pose the problem that processing cannot be specified or performed. The widths and heights of the luma component and the chroma component of an image are different from each other due to the 4:0:0, 4:2:0, 4:2:2, and 4:4:4 chroma sub-sampling, but NPL 1 and NPL 2 fail to specify how the processing is performed to derive the input tensor. NPL 1 and NPL 2 also fail to specify how to generate an image from the output tensor in accordance with the chroma sub-sampling.

NPL 3 defines the relationship between channels and color components of a tensor only in a case that input and output use 4:2:0 chroma sub-sampling, an input tensor includes 10 channels, and an output tensor includes 6 channels. However, NPL 3 poses the problem that no processing can be performed for the other formats. Another problem is that models that require no input of additional information fail to be dealt with.

Solution to Problem

A video decoding apparatus according to an aspect of the present invention is a video decoding apparatus including a prediction image derivation unit configured to decodes a prediction image and a residual decoder configured to decode a residual, wherein, for an input tensor and an output tensor of a neural network model, the input tensor is derived from a parameter indicating the number of channels of the input tensor and the output tensor, or an image is derived from the output tensor.

A video decoding apparatus including a prediction image derivation unit configured to decode a prediction image, and a residual decoder configured to decode a residual, wherein the video decoding apparatus derives input/output image information indicating the number of channels of an input tensor and an output tensor of a neural network model and additional input information, derives a part of the input tensor from a first image by using the input/output image information, and further derives a second image different from the first image by using the additional input information, or another part of the input tensor by using coding information related to the derivation of the prediction image or decoding of a residual.

Loop processing is performed in a raster scan manner by changing an addition value of a loop variable using a parameter of chroma sub-sampling, and within the loop, the input tensor is derived from the image, and the output tensor is derived by applying a deep learning filter to the input tensor.

A video decoding apparatus includes a prediction image derivation unit configured to decode a prediction image, and a residual decoder configured to decode a residual, the header unit infers a chroma format of an output related to chroma sub-sampling by a chroma format of an input in a case that there is no filter update information.

A video coding apparatus according to an aspect of the present invention is a video coding apparatus including a prediction image derivation unit configured to decode a prediction image, and a residual coder configured to decode a residual, wherein, for an input tensor and an output tensor of a neural network model, the input tensor is derived from a parameter indicating the number of channels of the input tensor and the output tensor, or an image is derived from the output tensor.

Advantageous Effects of Invention

With such a configuration, complexity of a neural network model indicated by an NN filter can be referenced without analyzing a neural network model designated by a URI. This is effective in facilitating determination of whether the video decoding apparatus has a post filter processing capability using a neural network filter.

BRIEF DESCRIPTION OF DRAWINGS

FIG. 7 is a diagram illustrating a configuration of a syntax table of an NN filter SEI according to the present embodiment.

FIG. 8 is a diagram illustrating a configuration of the syntax table of the NN filter SEI in a case that a parameter type of a neural network model is described separately in terms of a numerical type and a bit width.

FIG. 9 is a diagram illustrating a configuration of the syntax table of the NN filter SEI in a case that the bit width of parameter type of the neural network model is described in logarithmic representation.

FIG. 11 is a diagram illustrating a configuration of a syntax table of post filter purpose SEI.

FIG. 12 is a diagram illustrating a configuration of a neural network of the NN filter unit 611.

FIG. 14 is a diagram illustrating a syntax example of NN filter SEI.

FIG. 15 is a table indicating an input data format defined by an NN filter.

FIG. 16 is a table indicating an output data format defined by the NN filter.

FIG. 17 is a table indicating a method of converting a decoded image into an input data format defined by the NN filter.

FIG. 18 is a table indicating a method of conversion from an output data format defined by the NN filter to an output image.

FIG. 19 is a diagram illustrating a syntax example of the NN filter SEI.

FIG. 20 is a diagram illustrating the relationship between the number of dimensions of an input tensor (the number of input channels) and a conversion method, and the number of dimensions of an output tensor (the number of output channels) and a conversion method.

DESCRIPTION OF EMBODIMENTS

First Embodiment

Embodiments of the present invention will be described below with reference to the drawings.

Figure 1:
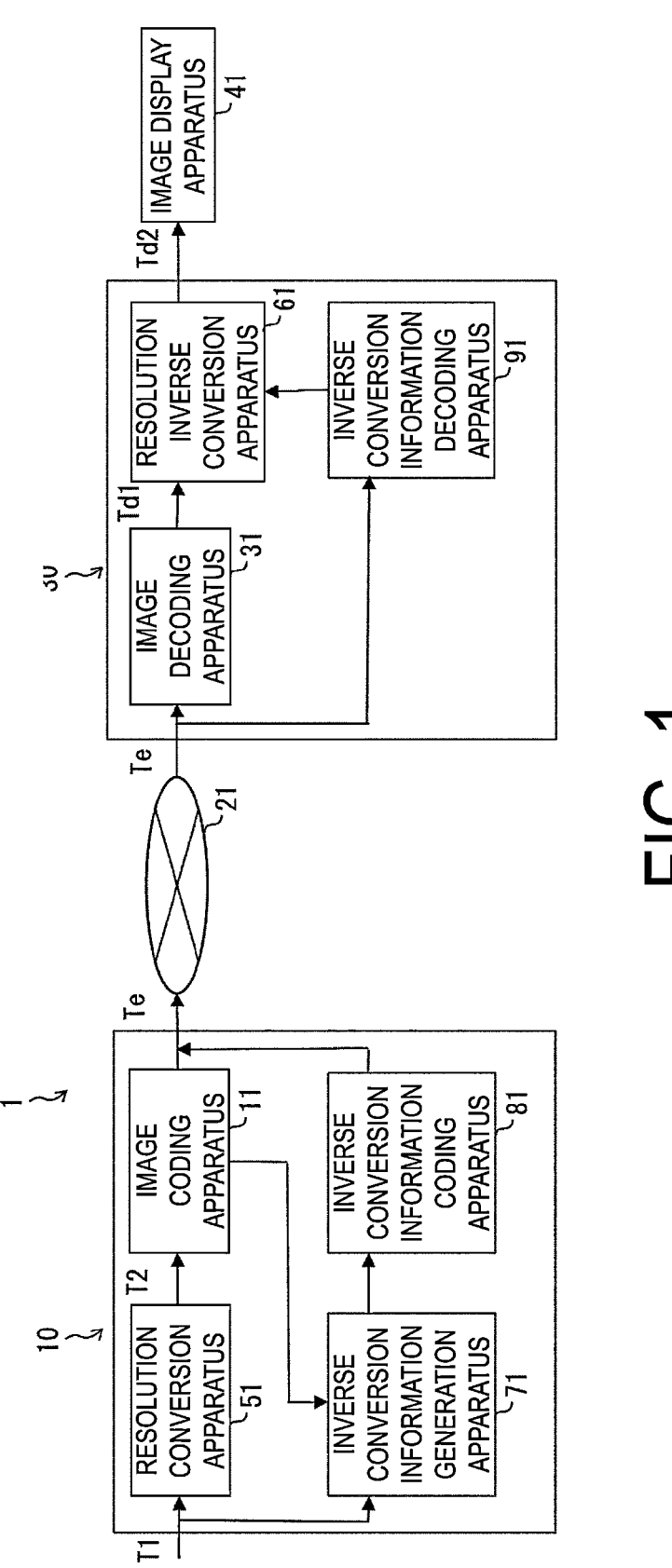
FIG. 1 is a schematic diagram illustrating a configuration of a video transmission system according to the present embodiment.

FIG. 1 is a schematic diagram illustrating a configuration of a video transmission system according to the present embodiment.

The video transmission system 1 is a system for transmitting coded data in which an image of different resolution converted in resolution is coded, decoding the coded data transmitted, and inversely converting the coded data decoded into the image with the original resolution for display. The video transmission system 1 includes a video coding apparatus 10, a network 21, a video decoding apparatus 30, and an image display apparatus 41.

The video coding apparatus 10 includes a resolution conversion apparatus (resolution conversion unit) 51, an image coding apparatus (image coder) 11, an inverse conversion information generation apparatus (inverse conversion information generation unit) 71, and an inverse conversion information coding apparatus (inverse conversion information coder) 81.

The video decoding apparatus 30 includes an image decoding apparatus (image decoder) 31, a resolution inverse conversion apparatus (resolution inverse conversion processing unit) 61, and an inverse conversion information decoding apparatus (inverse conversion information decoder) 91.

The resolution conversion apparatus 51 converts the resolution of an image T included in a video, and supplies a variable resolution video T2 including the image with a different resolution to the image coding apparatus 11. The resolution conversion apparatus 51 supplies, to the image coding apparatus 11, inverse conversion information indicating the presence or absence of resolution conversion of the image. In a case that the information indicates resolution conversion, the video coding apparatus 10 sets the resolution conversion information equal to 1, and includes the information in a Sequence Parameter Set SPS of coded data Te for coding.

The inverse conversion information generation apparatus 71 creates the inverse conversion information, based on an image T1 included in the video. The inverse conversion information is derived or selected based on the relationship between the input image T1 before resolution-conversion and an image Td1 after resolution-conversion, coding, and decoding. Additional information is information indicating what is selected.

The inverse conversion information is input to the inverse conversion information coding apparatus 81. The inverse conversion information coding apparatus 81 codes the inverse conversion information to generate coded inverse conversion information, and sends the coded inverse conversion information to the network 21.

The variable resolution image T2 is input to the image coding apparatus 11. With use of a framework of Reference Picture Resampling (RPR) the image coding apparatus 11 codes image size information of an input image for each PPS, and transmits the coded image size information to the image decoding apparatus 31.

Although the inverse conversion information coding apparatus 81 is not connected to the image coding apparatus 11 in FIG. 1, the inverse conversion information coding apparatus 81 and the image coding apparatus 11 may communicate necessary information as appropriate.

The network 21 transmits the coded inverse conversion information and the coded data Te to the image decoding apparatus 31. A part or all of the coded inverse conversion information may be included in the coded data Te as supplemental enhancement information SEI. The network 21 is the Internet, a Wide Area Network (WAN), a Local Area Network (LAN), or a combination thereof. The network 21 is not limited to a bidirectional communication network and may be a unidirectional communication network that transmits broadcast waves for terrestrial digital broadcasting, satellite broadcasting, or the like. In addition, the network 21 may be substituted with a storage medium in which the coded data Te is recorded, such as a Digital Versatile Disc (DVD) (trade name) or a Blu-ray Disc (BD) (trade name).

The image decoding apparatus 31 decodes each of the coded data Te transmitted by the network 21 and generates and supplies a variable resolution decoded image Td1 to the resolution inverse conversion apparatus 61.

The inverse conversion information decoding apparatus 91 decodes the coded inverse conversion information transmitted from the network 21 to generate inverse conversion information and transmits the inverse conversion information to the resolution inverse conversion apparatus 61.

Although the inverse conversion information decoding apparatus 91 is illustrated separately from the image decoding apparatus 31 in FIG. 1, the inverse conversion information decoding apparatus 91 may be included in the image decoding apparatus 31. For example, the inverse conversion information decoding apparatus 91 may be included in the image decoding apparatus 31 separately from each functional unit of the image decoding apparatus 31. Although the inverse conversion information decoding apparatus 91 is not connected to the image decoding apparatus 31 in FIG. 1, the inverse conversion information decoding apparatus 91 and the image decoding apparatus 31 may communicate necessary information as appropriate.

In a case that the resolution conversion information indicates resolution conversion, the resolution inverse conversion apparatus 61 generates a decoded image with the original size by inversely converting the resolution-converted image via super-resolution processing using a neural network, based on the image size information included in the coded data.

The image display apparatus 41 displays all or part of one or multiple decoded images Td2 input from the resolution inverse conversion apparatus 61. For example, the image display apparatus 41 includes a display device such as a liquid crystal display and an organic Electro-luminescence (EL) display. Examples of display types include stationary, mobile, and HMD. In addition, in a case that the image decoding apparatus 31 has a high processing capability, an image having high image quality is displayed, and in a case that the apparatus has a lower processing capability, an image which does not require a high processing capability and display capability is displayed.

Figure 3:
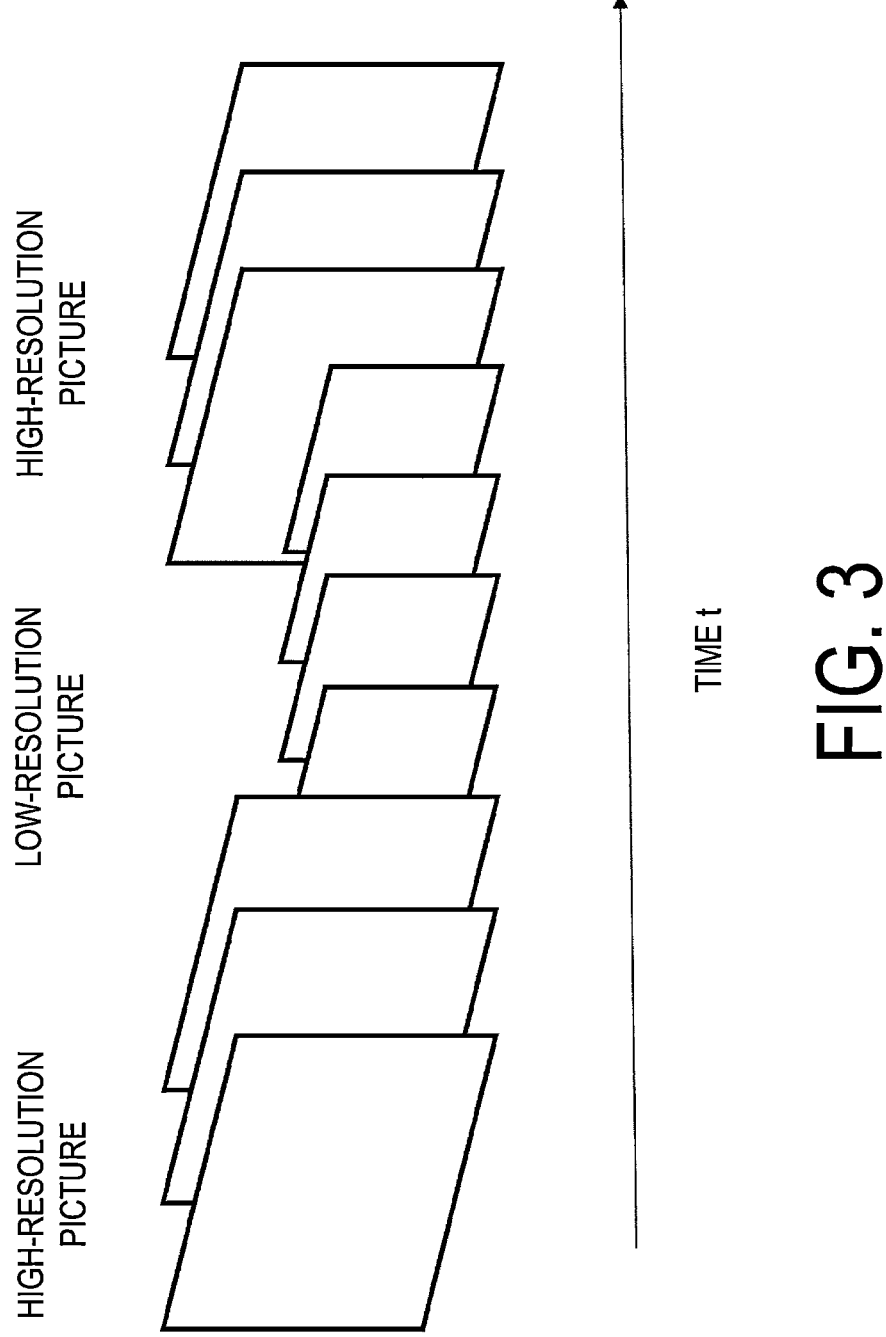
FIG. 3 is a conceptual diagram of an image to be processed in the video transmission system according to the present embodiment.

FIG. 3 is a conceptual diagram of an image to be processed in the video transmission system illustrated in FIG. 1 and is a diagram illustrating a change in resolution of the image over time. However, in FIG. 3, whether the image is coded is not distinguished. FIG. 3 illustrates an example in which, during the processing process of the video transmission system, an image with the resolution reduced is transmitted to the image decoding apparatus 31. As illustrated in FIG. 3, typically, the resolution conversion apparatus 51 performs a conversion for reducing the resolution of the image to decrease the amount of information to be transmitted.

Operators

Operators used in the present specification will be described below.

">>" is a right bit shift, "<<" is a left bit shift, "&" is a bitwise AND, "|" is a bitwise OR, "|=" is an OR assignment operator, and "||" indicates a logical sum.

x?y:z is a ternary operator that takes y in a case that x is true (not 0) and takes z in a case that x is false (0).

Clip3(a, b, c) is a function to clip c in a value from a to b, and a function to return a in a case that c is smaller than a (c<a), return b in a case that c is greater than b (c>b), and return c in the other cases (provided that a is smaller than or equal to b (a<=b)).

abs(a) is a function that returns the absolute value of a.

Int(a) is a function that returns the integer value of a.

floor(a) is a function that returns the maximum integer equal to or smaller than a.

ceil(a) is a function that returns the minimum integer equal to or greater than a.

a/d represents division of a by d (round down decimal places).

a^b represents power (a, b). In a case that a=2, then 1<<b.

Structure of Coded Data Te

Prior to the detailed description of the image coding apparatus 11 and the image decoding apparatus 31 according to the present embodiment, a data structure of the coded data Te generated by the image coding apparatus 11 and decoded by the image decoding apparatus 31 will be described.

Figure 2:
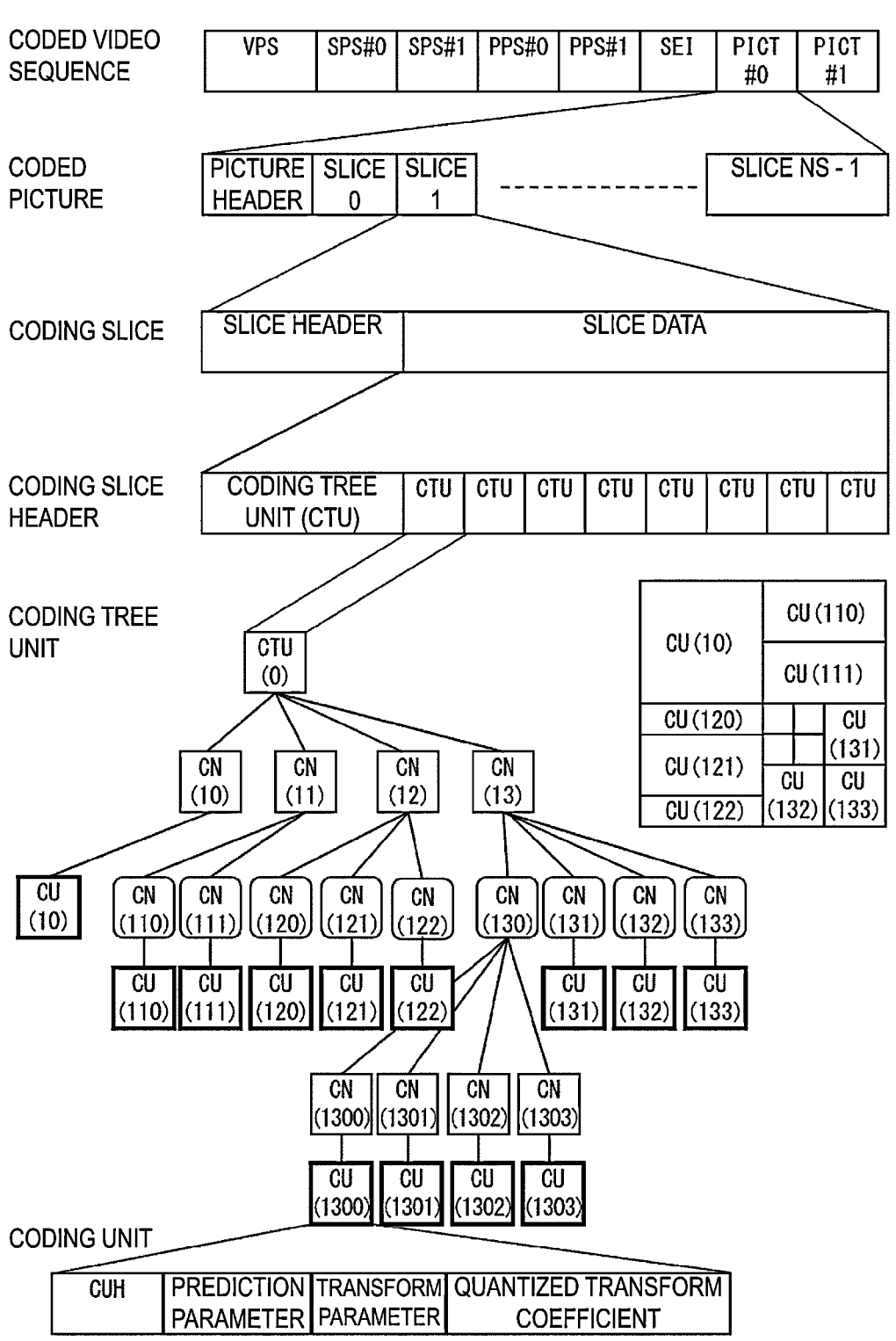
FIG. 2 is a diagram illustrating a hierarchical structure of coded data.

FIG. 2 is a diagram illustrating a hierarchical structure of the coded data Te. The coded data Te includes a sequence and multiple pictures constituting the sequence illustratively. FIG. 2 is a diagram illustrating a coded video sequence predetermining a sequence SEQ, a coded picture defining a picture PICT, a coding slice defining a slice S, coding slice data defining slice data, a coding tree unit included in the coding slice data, and a coding unit included in the coding tree unit.

Coded Video Sequence

In the coded video sequence, a set of data referred to by the image decoding apparatus 31 to decode the sequence SEQ to be processed is defined. As illustrated in FIG. 2, the sequence SEQ includes a Video Parameter Set VPS, a Sequence Parameter Set SPS, a Picture Parameter Set PPS, an Adaptation Parameter Set (APS), a picture PICT, and Supplemental Enhancement Information SEI.

In the video parameter set VPS, with respect to a video including multiple layers, a set of coding parameters common to multiple videos and a set of coding parameters associated with the multiple layers and an individual layer included in the video are defined.

In the sequence parameter set SPS, a set of coding parameters referred to by the image decoding apparatus 31 to decode a target sequence is defined. For example, a width and a height of a picture are defined. Note that multiple SPSs may exist. In that case, any of the multiple SPSs is selected from the PPS.

Here, the sequence parameter set SPS includes the following syntax elements.

pic_width_max_in_luma_samples: A syntax element indicating, in units of luminance blocks, the width of one of the images in a single sequence, the image having the largest width. In addition, the syntax element has a value required to not be 0 and to be an integer multiple of Max(8, MinCbSizeY). Here, MinCbSizeY is a value determined by the minimum size of the luminance blocks.

pic_height_max_in_luma_samples: A syntax element indicating, in units of luminance blocks, the height of one of the images in a single sequence, the image having the largest height. In addition, the syntax element has a value required to not be 0 and to be an integer multiple of Max(8, MinCbSizeY).

In the picture parameter set PPS, a set of coding parameters referred to by the image decoding apparatus 31 to decode each picture in a target sequence is defined. Note that multiple PPSs may exist. In that case, any of the multiple PPSs is selected from each picture in a target sequence.

Here, the picture parameter set PPS includes the following syntax elements.

pic_width_in_luma_samples: a syntax element indicating the width of a target picture. The value of the syntax element is required to not be 0 and to be an integer multiple of Max(8, MinCbSizeY) and equal to or less than pic_width_max_in_luma_samples.

pic_height_in_luma_samples: a syntax element indicating the height of the target picture. The value of the syntax element is required to not be 0 and to be an integer multiple of Max(8, MinCbSizeY) and equal to or less than pic_height_max_in_luma_samples.

Coded Picture

In a coded picture, a set of data referred to by the image decoding apparatus 31 to decode a picture PICT to be processed is defined. As illustrated in FIG. 2, the picture PICT includes a picture header PH and slices 0 to NS−1 (NS is the total number of slices included in the picture PICT).

In the description below, in a case that the slices 0 to NS−1 need not be distinguished from one another, suffixes of reference signs may be omitted. In addition, the same applies to other data with suffixes included in the coded data Te which will be described below.

Coding Slice

In a coding slice, a set of data referred to by the image decoding apparatus 31 to decode a slice S to be processed is defined. The slice includes a slice header and slice data as illustrated in FIG. 2.

The slice header includes a coding parameter group referenced by the image decoding apparatus 31 to determine a decoding method for a target slice. Slice type indication information (slice_type) indicating a slice type is one example of a coding parameter included in the slice header.

Examples of slice types that can be indicated by the slice type indication information include (1) I slice for which only intra prediction is used in coding, (2) P slice for which uni-prediction (L0 prediction) or intra prediction is used in coding, and (3) B slice for which uni-prediction (L0 prediction or L1 prediction), bi-prediction, or intra prediction is used in coding, and the like. Note that the inter prediction is not limited to uni-prediction and bi-prediction, and a prediction image may be generated by using a larger number of reference pictures. Hereinafter, in a case of a slice being referred to as a P or B slice, it indicates a slice including a block in which inter prediction can be used.

Note that the slice header may include a reference to the picture parameter set PPS (pic_parameter_set_id).

Coding Slice Data

In coding slice data, a set of data referred to by the image decoding apparatus 31 to decode slice data to be processed is defined. Slice data includes CTUs as illustrated in the coding slice header of FIG. 2. A CTU is a block in a fixed size (for example, 64×64) constituting a slice, and may also be called a Largest Coding Unit (LCU).

Coding Tree Unit

In FIG. 2, the set of data referred to by the image decoding apparatus 31 to decode a CTU to be processed is defined. The CTU is split into coding units CUs, each of which is a basic unit of coding processing, by a recursive Quad Tree (QT) split, Binary Tree (BT) split, or Ternary Tree (TT) split. A node of a tree structure obtained by recursive quad tree split is referred to as a Coding Node. An intermediate node of a quad tree, a binary tree, and a ternary tree is a coding node, and a CTU itself is also defined as the highest coding node.

The CT includes, as CT information, a CU split flag indicating whether to perform a CT split, a QT split flag indicating whether to perform a QT split, an MT split direction indicating a split direction of MT split, and an MT split type indicating a split type of the MT split. split_cu_flag, qt_split_cu_flag, mtt_split_cu_vertical_flag, and mtt_split_cu_binary_flag are transmitted to each coding node.

Coding Unit

In FIG. 2, a set of data referred to by the image decoding apparatus 31 to decode a coding unit to be processed is defined. Specifically, a CU includes a CU header CUH, a prediction parameter, a transform parameter, a quantized transform coefficient, and the like. In the CU header, a prediction mode and the like are defined.

There are two types of predictions (prediction modes), which are intra prediction and inter prediction. Intra prediction refers to prediction in the same picture, and inter prediction refers to prediction processing performed between different pictures (for example, between pictures of different display times, and between pictures of different layer images).

Although transform and quantization processing is performed on a CU basis, entropy coding of a quantized transform coefficient may be performed on a per subblock basis such as 4×4.

Note that, in a case that the present specification mentions "a flag indicating whether XX is applied", the flag indicating a value other than 0 (for example, 1) means a case where XX is applied, and the flag indicating 0 means a case where XX is not applied, and 1 is treated as true and 0 is treated as false in a logical negation, a logical product, and the like (hereinafter, the same applies). However, other values can be used for true values and false values in real apparatuses and methods.

Motion Vector

The motion vector indicates a shift amount between blocks in two different pictures.

Configuration of Image Decoding Apparatus

Figure 4:
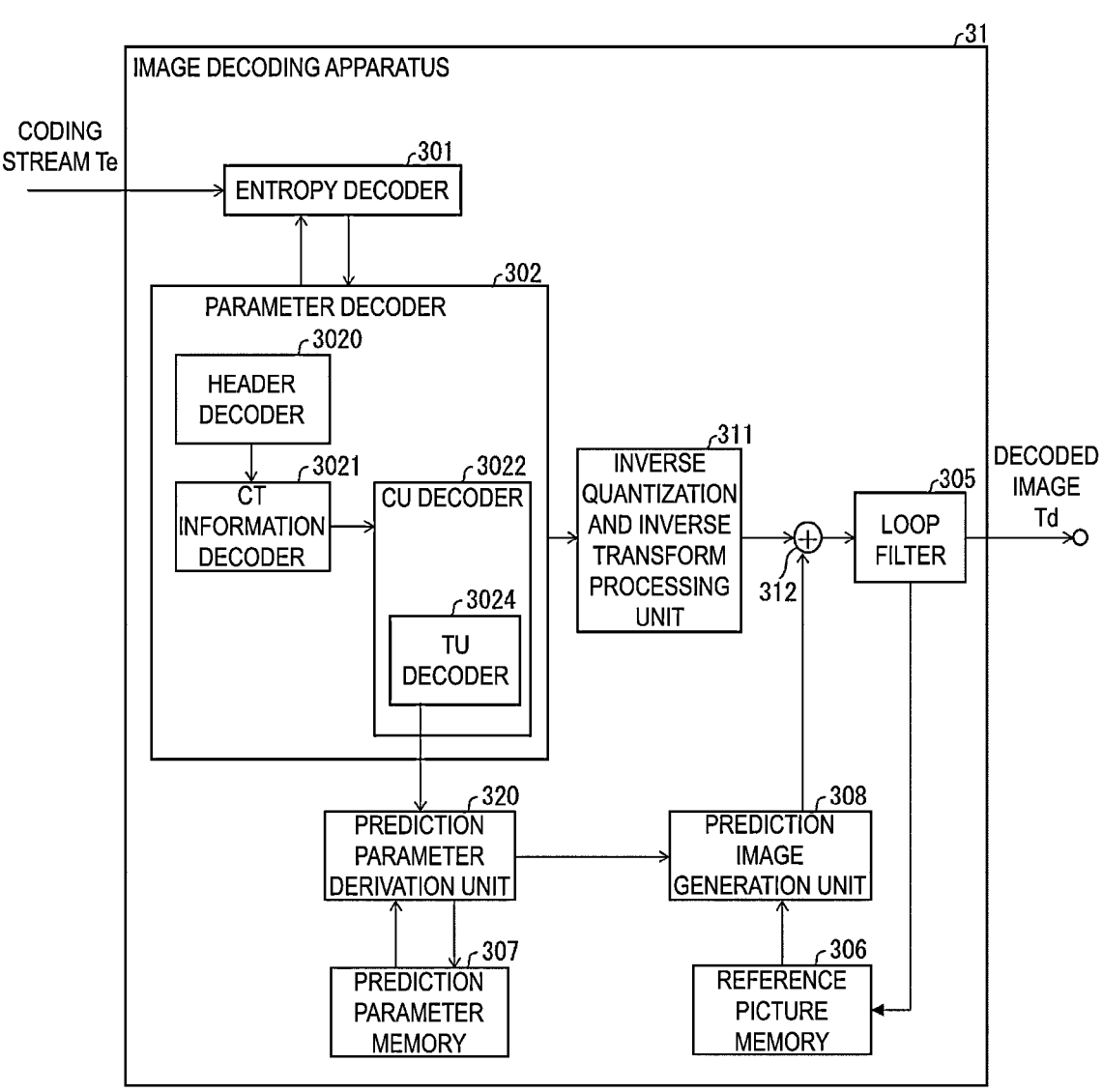
FIG. 4 is a schematic diagram illustrating a configuration of an image decoding apparatus.

The configuration of the image decoding apparatus 31 (FIG. 4) according to the present embodiment will be described.

The image decoding apparatus 31 is configured to include an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Further, the image decoding apparatus 31 may be configured to not include the loop filter 305 in accordance with the image coding apparatus 11 described later.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, parameter set information such as a VPS, an SPS, a PPS, and an APS, and a slice header (slice information). The CT information decoder 3021 decodes a CT from coded data. The CU decoder 3022 decodes a CU from coded data. In a case that a TU includes a prediction error, the TU decoder 3024 decodes QP update information (quantization correction value) and a quantization prediction error (residual_coding) from coded data.

The prediction image generation unit 308 includes an inter prediction image generation unit 309 and an intra prediction image generation unit 310.

The prediction parameter derivation unit 320 includes an inter prediction parameter derivation unit 303 and an intra prediction parameter derivation unit 304.

The entropy decoder 301 performs entropy decoding on the coded data Te input from an external source and decodes individual codes (syntax elements). The entropy coding includes a method in which variable-length coding of syntax elements is performed by using a context (probability model) adaptively selected according to a type of syntax element and a surrounding condition, and a method in which variable-length coding of syntax elements is performed by using a predetermined table or formula. The former Context Adaptive Binary Arithmetic Coding (CABAC) stores in memory a CABAC state of the context (the type of a dominant symbol (0 or 1) and a probability state index pStateIdx indicating a probability). The entropy decoder 301 initializes all CABAC states at the beginning of a segment (tile, CTU row, or slice). The entropy decoder 301 transforms the syntax element into a binary string (Bin String) and decodes each bit of the Bin String. In a case that the context is used, a context index ctxInc is derived for each bit of the syntax element, the bit is decoded using the context, and the CABAC state of the context used is updated. Bits that do not use the context are decoded at an equal probability (EP, bypass), and the ctxInc derivation and CABAC state are omitted. The decoded syntax element includes prediction information for generating a prediction image, a prediction error for generating a difference image, and the like.

The entropy decoder 301 outputs the decoded codes to the parameter decoder 302. Which code is to be decoded is controlled based on an indication of the parameter decoder 302.

Figure 5:
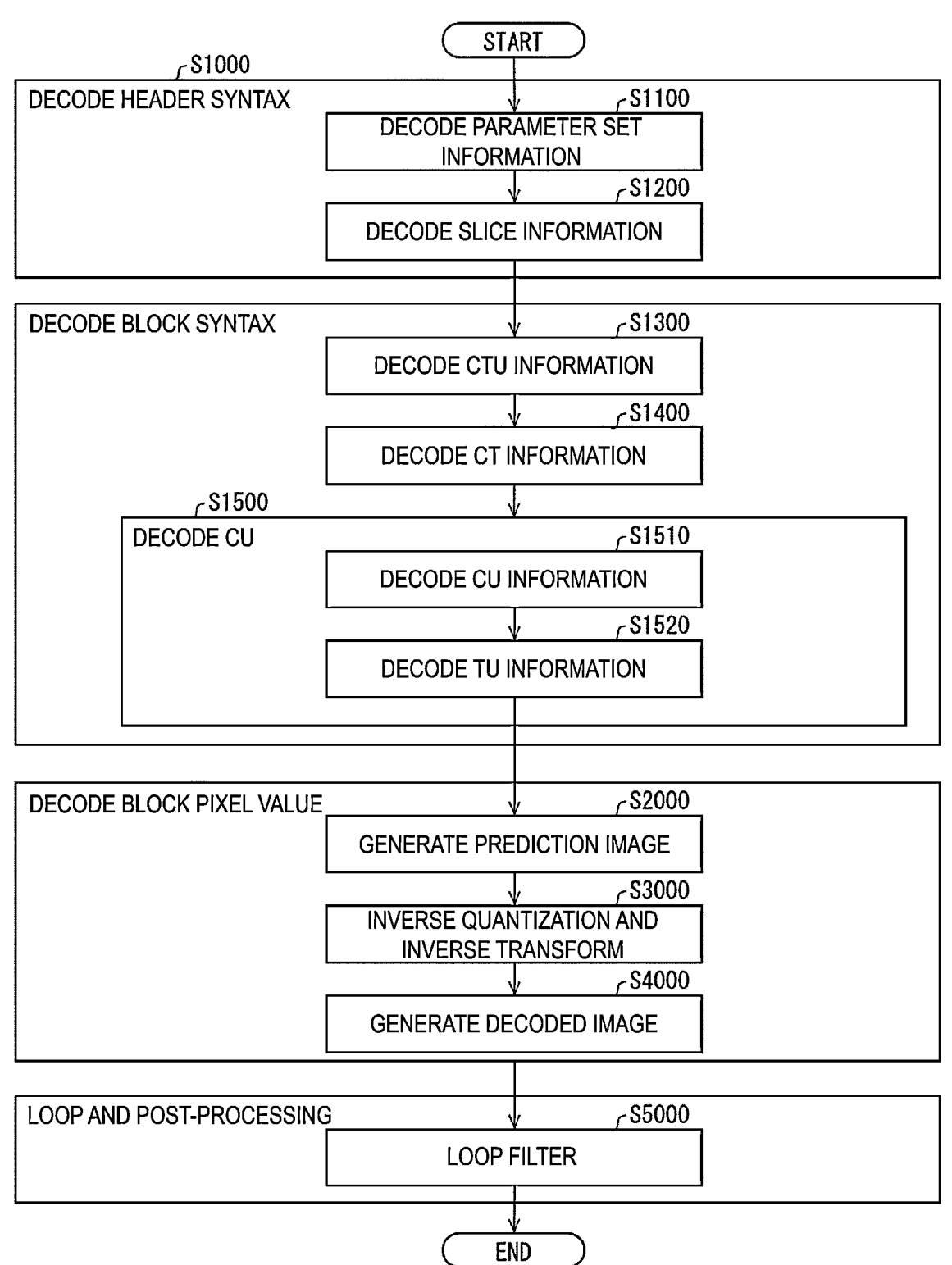
FIG. 5 is a flowchart for illustrating general operation of the image decoding apparatus.

Basic Flow FIG. 5 is a flowchart for illustrating general operation of the image decoding apparatus 31.

(S1100: Decoding of parameter set information) The header decoder 3020 decodes parameter set information such as a VPS, an SPS, and a PPS from coded data.

(S1200: Decoding of slice information) The header decoder 3020 decodes a slice header (slice information) from the coded data.

Afterwards, the image decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes CU information, prediction information, a TU split flag split_transform_flag, a CU residual flag cbf_cb, cbf_cr, and cbf_luma from the coded data.

(S1520: Decoding of TU information) In a case that a prediction error is included in the TU, the TU decoder 3024 decodes, from the coded data, QP update information and a quantization prediction error, and transform index mts_idx. Further, QP update information is a difference value from a quantization parameter prediction value qPpred, which is a prediction value of a quantization parameter QP.

(52000: Generation of prediction image) The prediction image generation unit 308 generates a prediction image, based on the prediction information, for each block included in the target CU.

(53000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied by the prediction image generation unit 308 and the prediction error supplied by the inverse quantization and inverse transform processing unit 311.

(S5000: Loop filter) The loop filter 305 generates a decoded image by applying a loop filter such as a deblocking filter, an SAO, and an ALF to the decoded image.

Configuration of Inter Prediction Parameter Derivation Unit

The inter prediction parameter derivation unit 303 (motion vector derivation apparatus) derives an inter prediction parameter with reference to the prediction parameters stored in the prediction parameter memory 307 based on the syntax element input from the parameter decoder 302. In addition, the inter prediction parameter is output to the inter prediction image generation unit 309 and the prediction parameter memory 307.

The loop filter 305 is a filter provided in the coding loop, and is a filter that removes block distortion and ringing distortion and improves image quality. The loop filter 305 applies a filter such as a deblocking filter, a sample adaptive offset (SAO), and an adaptive loop filter (ALF) to a decoded image of a CU generated by the addition unit 312.

The DF unit 601 includes a bS derivation unit 602 that derives strength bS of the deblocking filter in a unit of a pixel, a boundary, and a line segment, and a DF filter unit 602 that performs deblocking filter processing in order to reduce block noise.

The DF unit 601 derives an edge degree edgeIdc indicating whether there is a partition split boundary, a boundary of a prediction block, and a boundary of a transform block in an input image resPicture before NN processing (processing of the NN filter unit 601), and the maximum filter length maxFilterLength of the deblocking filter. Furthermore, the strength bS of the deblocking filter is derived from edgeIdc, the boundary of the transform block, and the coding parameters. edgeIdc and bS may take values of 0, 1, and 2, or may be other values.

The reference picture memory 306 stores the decoded image of the CU in a predefined position for each target picture and target CU.

The prediction parameter memory 307 stores the prediction parameter in a predefined position for each CTU or CU. Specifically, the prediction parameter memory 307 stores the parameter decoded by the parameter decoder 302, the parameter derived by the prediction parameter derivation unit 320, and the like.

Parameters derived by the prediction parameter derivation unit 320 are input to the prediction image generation unit 308. In addition, the prediction image generation unit 308 reads out a reference picture from the reference picture memory 306. The prediction image generation unit 308 generates a prediction image of a block or a subblock by using the parameters and the reference picture (reference picture block) in the prediction mode indicated by pred-Mode. Here, the reference picture block refers to a set of pixels (referred to as a block because they are normally rectangular) on a reference picture and is a region that is referred to for generating a prediction image.

In a case that predMode indicates the inter prediction mode, the inter prediction image generation unit 309 generates a prediction image of a block or a subblock through inter prediction by using the inter prediction parameters input from the inter prediction parameter derivation unit 303 and the reference picture.

In a case that predMode indicates an intra prediction mode, the intra prediction image generation unit 310 performs an intra prediction by using an intra prediction parameter input from the intra prediction parameter derivation unit 304 and a reference picture read out from the reference picture memory 306.

The inverse quantization and inverse transform processing unit 311 (residual decoder) performs inverse quantization on a quantized transform coefficient input from the parameter decoder 302 to calculate a transform coefficient.

The addition unit 312 adds the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

Configuration Example of NN Filter Unit 611

FIG. 12 is a diagram illustrating a configuration example of an interpolation filter, a loop filter, and a post filter using a neural network filter unit (NN filter unit 611). Although an example of the post-filter will be described below, the interpolation filter or the loop filter may be used.

The post-processing unit 61 after the video decoding apparatus includes the NN filter unit 611. In a case of outputting an image from the reference picture memory 306, the NN filter unit 611 performs filtering processing on the image and outputs the resultant image to the outside. Displaying, file writing, re-encoding (transcoding), transmission, and the like may be performed on the output image. The NN filter unit 611 is a means for performing, on the input image, filtering processing by a neural network model. At the same time, the image may be reduced or enlarged by a factor of 1 or a rational number.

Here, the neural network model (hereinafter referred to as an NN model) means elements and connection relationships (a topology) of a neural network and parameters (weights and biases) of the neural network. Note that the topology may be fixed and for the neural network model, the parameters may be exclusively switched.

Details of NN Filter Unit 611

An NN filter unit performs the filtering processing by the neural network model, using an input image inSamples and input parameters (for example, QP, bS, and the like). The input image may be an image for each component or may be an image having multiple components each used as a channel. The input parameters may be assigned to a different channel from the image.

The NN filter unit may repeatedly apply the following processing.

The NN filter unit performs convolution operation (conv, convolution) of a kernel $k[m][i][j]$ on inSamples, and derives an output image outSamples to which bias is added. Here, $nn=0 \ldots n-1$, $xx=0 \ldots width-1$, and $yy=0 \ldots height-1$.

In outSamples$[nn][xx][yy]=\Sigma\Sigma\Sigma(k[mm][i][j]*$inSamples$[mm][xx+i-of][yy+j-of]+$bias$[nn])$ 1×1 Conv, $\Sigma$ represents the sum of $mm=0 \ldots m-1$, $i=0$, and $j=0$. In this case, of $=0$ is set. In a case of 3×3 Conv, $\Sigma$ represents the sum for each of $mm=0 \ldots m-1$, $i=0 \ldots 2$, and $j=0 \ldots 2$. In this case, of $=1$ is set. n represents the number of channels of outSamples, m represents the number of channels of inSamples, width represents the width of inSamples and outSamples, and height represents the height of inSamples and outSamples. of represents the size of a padding area provided around inSamples in order to make inSamples and outSamples have the same size. In the following, in a case that output of the NN filter unit is a value (correction value) instead of an image, corrNN is used to represent output instead of outSamples.

Note that, in a case of description using inTensor and outTensor of the CHW format instead of inSamples and outSamples of the CWH format, the processing is equivalent to the following.

$$outTensor[nn][yy][xx]=\Sigma\Sigma\Sigma(k[mm][i][j]*inTensor[mm][yy+j-of][xx+i-of]+bias[nn])$$

Processing shown by the following expression referred to as Depth wise Conv may be performed. Here, $nn=0 \ldots n-1$, $xx=0 \ldots width-1$, and $yy=0 \ldots height-1$.

$$outSamples[nn][xx][yy]=11(k[nn][i][j]*inSamples[nn][xx+i-of][yy+j-of]+bias[nn])$$

$\Sigma$ represents the sum for each of i and j. n represents the number of channels of outSamples and inSamples, width represents the width of inSamples and outSamples, and height represents the height of inSamples and outSamples.

Non-linear processing referred to as Activate, such as ReLU, may be used.

$$ReLU(x)=x>=0?x:0$$

Alternatively, leakyReLU shown in the following formula may be used.

$$leakyReLU(x)=x>=0?x:a*x$$

Here, a is a prescribed value, for example, 0.1 or 0.125. In order to perform integer arithmetic, all of the above values of k, bias, and a may be integers, and right shifting may be performed after conv.

ReLU always outputs 0 for values less than 0 and directly outputs input values of 0 or more. In contrast, in leakyReLU, for values less than 0, linear processing is performed with a gradient being set equal to a. In ReLU, the gradient for values less than 0 disappears, and learning may not advance steadily. leakyReLU leaves a gradient for values less than 0, making such a problem less likely to occur. Of above leakyReLU(x), PReLU using a parameterized value of a may be used.

SEI for Reference of Neural Network Model Complexity)

FIG. 7 is a diagram illustrating a configuration of a syntax table of NN filter SEI according to the present embodiment. The SEI includes information of neural network model complexity.

nnrpf_id: an identification number of the NN filter.

nnrpf_mode_idc: an index of a mode indicating a method of indicating a neural network model used for the NN filter. A value of 0 indicates that the NN filter associated with nnrpf_id is not indicated in this SEI message. A value of 1 indicates that the NN filter associated with nnrpf_id is a neural network model identified by a prescribed Uniform Resource Identifier (URI). The URI is a character string for identification indicating a logical or physical resource. Note that actual data does not need to be present at a location indicated by the URI, as long as the character string can specify the resource. A value of 2 indicates that the NN filter associated with nnrpf_id is a neural network model represented by the ISO/JEC 15938-17 bitstream included in this SEI message. A value of 3 indicates that the NN filter associated with nnrpf_id is a neural network model identified in the NN filter SEI message used in the previous decoding and updated with the ISO/JEC 15938-17 bitstream included in this SEI message.

nnrpf_persistence_flag: a flag indicating the persistence of this SEI message for the current layer. A value of 0 indicates that this SEI message applies only to the current decoded picture. A value of 1 indicates application to the current decoded picture and its subsequent pictures in output order.

nnrpf_uri[i]: a character string for storing a reference destination URI of a neural network model used as an NN filter. i is the i-th byte of a UTF-8 character string terminated at NULL. In a case that nnrpf_mode_idc==1, the header coder 1110 and the header decoder 3020 decode nnrpf_uri which is a URI indicating a neural network model used as an NN filter. The neural network model corresponding to the character string indicated by nnrpf_uri is read from a memory provided in the video coding apparatus or the video decoding apparatus, or is read from an external source via a network.

nnrpf_payload_byte[i]: indicates the i-th byte of an ISO/IEC 15938-17 compliant bitstream.

The NN filter SEI includes the following syntax elements as neural network model complexity information (network model complexity information).

nnrpf_parameter_type_idc: an index indicating a variable type included in a parameter of the NN model. In a case that the value is 0, the NN model uses only an integer type. In a case that the value is 1, the NN model uses either a floating point type or the integer type.

nnrpf_num_parameters_idc: an index indicating the number of parameters of the NN model used in the post-filter. A value of 0 indicates that the number of parameters of the NN model is not defined. In a case that the value is not 0, the following processing is performed using nnrpf_num_parameters_idc to derive the number of parameters of the NN model.

The header coder 1110 and the header decoder 3020 may derive the maximum value MaxNNParameters of the number of parameters of the NN model, based on nnrpf_num_parameters_idc as follows, and code and decode the network model complexity information.

$$\text{MaxNNParameters=} (\text{UNITPARAM} << \text{nnrpf\_num\_parameters\_idc})-1$$

Here, UNITPARAM is a prescribed constant and may be UNITPARAM=2048=2^11.

Note that the shift operation has the same value as an exponent, and may be the following.

$$\text{MaxNNParameters=2}^{\text{(nnrpf\_num\_parameters\_idc+}11)}-1$$

The unit of the number of parameters need not be a double unit but may be a combination of the double unit and a 1.5 times unit as follows:

$$\text{MaxNNParameters=(nnrpf\_num\_parameters\_idc\&1)?}$$
$$(\text{UNITPARAM2} << \text{nnrpf\_num\_parameters\_idc})-$$
$$1\text{:}(\text{UNITPARAM} << \text{nnrpf\_num\_parameters\_idc})-1$$

Here, UNITPARAM2 may be a prescribed constant equal to UNITPARAM*1.5. For example, in a case that UNITPARAM=2048, then UNITPARAM2=3072.

The following condition may also be used.

$$\text{MaxNNParameters=(nnrpf\_num\_parameters\_idc\&1):}$$
$$2^{\text{(nnrpf\_num\_parameters\_idc+11)}}*1.5\text{-}1\text{:}2^{}$$
$$(\text{nnrpf\_num\_parameters\_idc+11})-1$$

In other words, the header coder 1110 sets the value of nnrpf_num_parameter_idc in such a manner that the number of parameters of the actual NN model is equal to or less than MaxNNParameters. The header decoder 3020 decodes the coded data set as described above.

Note that a linear expression may be used to derive the MaxNNParameters.

$$\text{MaxNNParameters=}$$
$$(\text{UNITPARAM}*\text{nnrpf\_num\_parameters\_idc})-1$$

At this time, UNITPARAM may be 10000. UNITPARAM preferably has a value equal to or greater than 1000 and is preferably a multiple of 10.

nnrpf_num_kmac_operations_idc: a value indicating the scale of the number of operations required for post-filter processing. The header coder 1110 and the header decoder 3020 obtain the MaxNNOperations based on nnrpf_num_kmac_operations_idc as follows: MaxNNOperations is the maximum value of the number of operations required for post-filter processing.

$$\text{MaxNNOperations=nnrpf\_num\_kmac\_operations\_}$$
$$\text{ide}*1000*\text{pictureWidth}*\text{pictureHeight}$$

where pictureWidth and pictureHeight are the width and height of a picture input to the post-filter.

That is, the video coding apparatus sets the value of nnrpf_num_kmac_operations_idc in accordance with the number of operations required for the post-filter processing.

In the above description, by transmitting or coding or decoding the syntax of the network model complexity information related to the amount of processing defined by using a prescribed constant as a unit, the complexity can be simply effectively transmitted. Further, the use of a multiple of 10 advantageously makes the value easily understandable by a human. A value of 1000 or more enables the size of the model to be suitably expressed with a small number of segments, and allows the model to be efficiently transmitted.

In other words, the syntax indicating the network model complexity information indicates the upper limit of the number of parameters or the number of operations, and the number of parameters or the number of operations is defined in units of the exponent power of 2. Alternatively, the number of parameters or the number of operations may be defined in units of the exponent power of 2 or 1.5 times the exponent power of 2. The number of parameters or the number of operations may be defined in units of multiples of 10.

Further, in the above description, by transmitting or coding or decoding the syntax of the network model complexity information related to the amount of processing defined by shift representation or exponential representation, the complexity can be efficiently transmitted with a shorter code.

nnrpf_alignment_zero_bit: a bit for byte alignment. The header coder 1110 and the header decoder 3020 code and decode the code "0" bit by bit until the bit position reaches a byte boundary.

nnrpf_operation_type_idc: an index indicating limitation of elements or limitation of topology used in the NN model of the post-filter. For example, depending on the value of the index, the processing may be performed as follows:

In a case that the value is 3, the elements or topologies are limited as follows: The maximum size of the kernel is 5×5, the maximum number of channels is 32, leaky ReLU or only ReLU can be used for an activation function, and the maximum level of branching is 3 (excluding skip connection).

In a case that the value is 2, in addition to the above limitations imposed, the use of leaky Relu in the activation function is inhibited, and branching other than skip connection is inhibited (for example, U-Net or grouping convolution is not performed).

In a case that the value is 1, in addition to the above limitations imposed, mapping from space to channel (e.g., Pixel Shuffler) is inhibited and global average pooling is inhibited.

In a case that the value is 0, the elements or topologies are not limited.

Another Configuration Example 1

A parameter nnrpf_parameter_type_idc indicating network model complexity information may be defined as follows:

nnrpf_parameter_type_idc: an index indicating a parameter type of a neural network model. For example, the parameter type may be determined as follows according to the value of the parameter.

The parameter type is defined as a 8-bit unsigned integer type in a case that the value is 0, a 16-bit unsigned integer type in a case that the value is 1, a 32-bit unsigned integer type in a case that the value is 2, a 16-bit floating-point type (bfloat16) in a case that the value is 3, a 16-bit floating-point type (half-precision) in a case that the value is 4, or a 32-bit floating-point type (single-precision) in a case that the value is 5.

Another Configuration Example 2

FIG. 8 is a diagram illustrating a configuration of a syntax table of NN filter SEI including network model complexity information. In this example, the parameter type of the neural network model is defined separately in terms of a numerical type and a bit width.

In this configuration example, the definition of the following syntax information in the SEI in FIG. 7 is changed.

nnrpf_parameter_type_idc: an index indicating the numerical type of the neural network model. For example, the numerical type may be determined as follows according to the value of the parameter.

The numerical type is defined as an integer type in a case that the value is 0, or a floating point type in a case that the value is 1.

In addition to the syntax of the SEI in FIG. 7, the following syntax information is included.

nnrpf_parameter_bit_width_ide: an index indicating the bit width of the neural network model. For example, the bit width may be determined as follows according to the value of the parameter.

The bit width is defined as 8 bits in a case that the value is 0, 16 bits in a case that the value is 1, or 32 bits in a case that the value is 2.

Another Configuration Example 3

FIG. 9 is a diagram illustrating a configuration of a syntax table of NN filter SEI including network model complexity information. Here, the bit width of the parameter type of the neural network model is defined by logarithmic representation.

In this configuration example, the following syntax information is included instead of nnrpf_parameter_bit_width_idc.

nnrpf_log 2_parameter_bit_width_minus3: the bit width of the parameter of the neural network model is represented by the logarithm of 2. Based on nnrpf_log 2_parameter_bit_width_minus3, the bit width parameterBitWidth of the parameter is determined as follows:

$$\text{parameterBitWidth}=1<<(\text{nnrpf\_log} \quad 2\_\text{parameter\_bit\_width\_minus3}+3)$$

Decoding of SEI and Post-Filter Processing

The header decoder 3020 decodes the network model complexity information from the SEI message defined in FIGS. 7 to 9. The SEI is additional information regarding processing associated with decoding, display, and the like.

Figure 10:
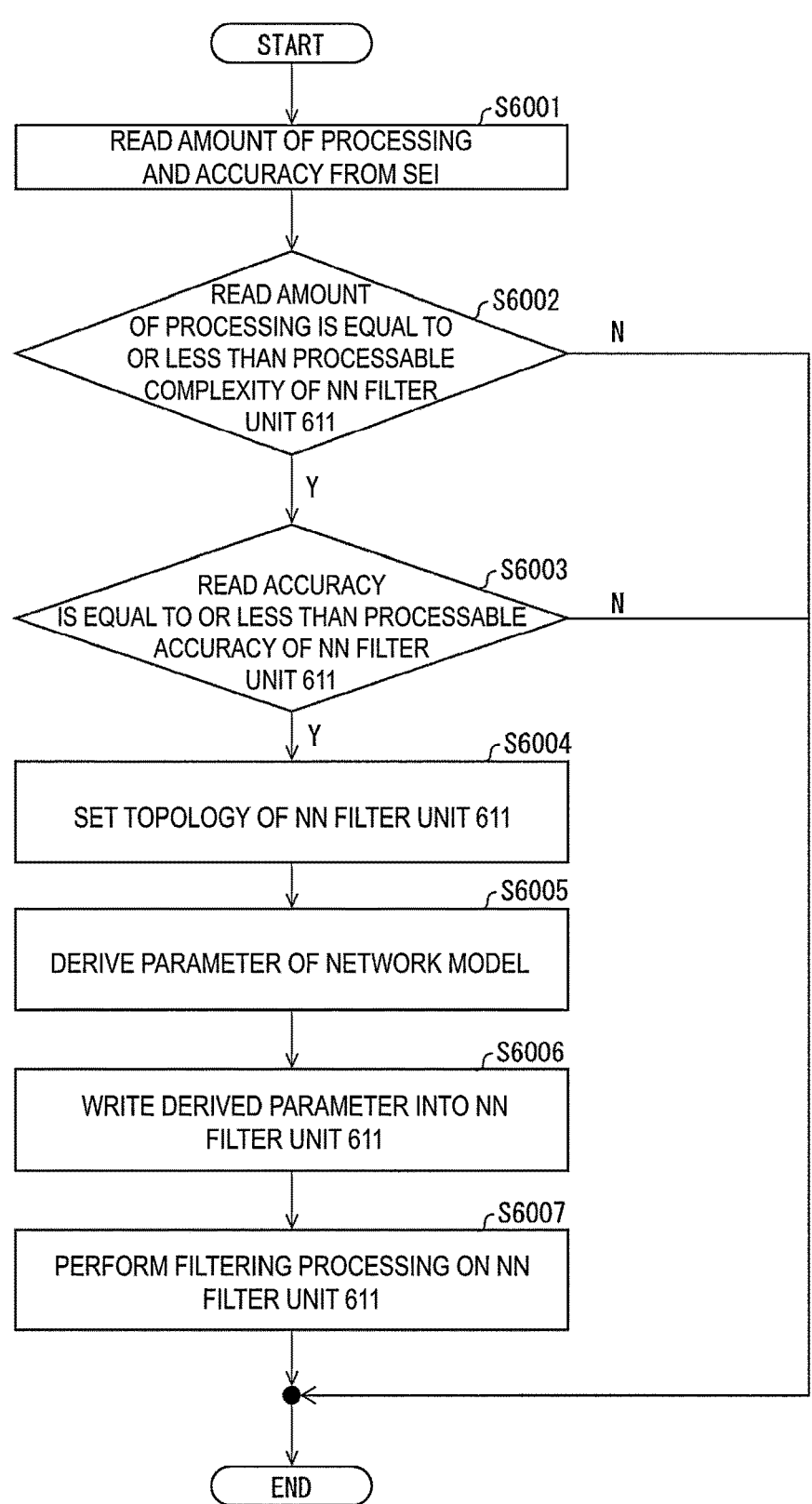
FIG. 10 is a diagram illustrating a flowchart of processing of an NN filter unit 611.

FIG. 10 is a diagram illustrating a flowchart of processing of the NN filter unit 611. The NN filter unit 611 performs the following processing in accordance with parameters of the SEI message.

S6001: Read the amount of processing and accuracy from the network model complexity information of the SEI.

S6002: End the processing in a case that the accuracy exceeds processable accuracy of the NN filter unit 611. In a case that it does not exceed the processable complexity, proceed to S6003.

S6003: End the processing in a case that the accuracy exceeds processable accuracy of the NN filter unit 611. In a case that it does not exceed the processable accuracy, proceed to S6004.

S6004: Identify a network model from the SEI, and set topology of the NN filter unit 611.

S6005: Derive the parameters of the network model from update information of the SEI.

S6006: Write the derived parameters of the network model into the NN filter unit 611.

S6007: Perform filtering processing of the NN filter unit 611, and output resultant information to the outside.

Note that the SEI is not necessarily required for construction of a luminance sample and a chroma sample in decoding processing.

SEI for Reference of Neural Network Model Data Format

FIG. 14 is a diagram illustrating another configuration of a syntax table of NN filter SEI according to the present embodiment. The present SEI includes information in a neural network model (NN model) data format. Description of the same syntax element as the SEI including the neural network model complexity information described above will be omitted.

nnrpf_input_format_idc: an input tensor identification parameter. It indicates a format of input data (input tensor) of the NN model used in the NN filter. As illustrated in FIG. 15, the header decoder 3020 derives the format of the input data (the number of channels (NumInChannels) and a data format) based on the value of nnrpf_input_format_idc.

In a case that nnrpf_input_format_idc==0, the format of the input data is one-channel (luma) three dimensional data (3D tensor). It indicates that the luma channel of a decoded image is used as input data of the NN filter. In the present embodiment, the three dimensions of the three dimensional data described above are defined as the order of (C, H, W), but the order of the dimensions is not limited thereto. For example, the data may be stored in the order of (H, W, C). In this case, since the number of channels is one, two dimensional data (H, W) may be used.

In a case that nnrpf_input_format_idc==1, the format of the input data is two-channel (chroma) three dimensional data (3D tensor). It indicates that the two chroma channels (U and V) of the decoded image are used as input data of the NN filter.

In a case that nnrpf_input_format_idc==2, the format of the input data is a three-channel (luma channel and two chroma channels) three dimensional data (3D tensor). It indicates that a luma channel and two chroma channels of the decoded image are used as input data of the NN filter in 4:4:4 format.

In a case that nnrpf_input_format_idc==3, the format of the input data is a six-channel (four luma channels and two chroma channels) three dimensional data (3D tensor). It indicates that four channels derived from the luma channel and two chroma channels of the decoded image in the 4:2:0 format are used as input data of the NN filter.

nnrpf_output_format_idc: an output tensor identification parameter. It indicates the format of output data (NN output data, output tensor) from the NN model used in the NN filter. As illustrated in FIG. 16, the header decoder 3020 derives the format of output data (the number of channels (NumOutChannels), the data format) based on the value of nnrpf_output_format_idc.

In a case that nnrpf_output_format_idc==0, the format of NN output data is one-channel (luma) three dimensional data (3D tensor). It indicates that the output data of the NN filter is used as the luma channel of the output image.

In a case that nnrpf_output_format_idc==1, the format of the NN output data is two-channel (chroma) three dimensional data (3D tensor). It indicates that the output data of the NN filter is used as two chroma channels (U and V) of the output image.

In a case that nnrpf_output_format_idc==2, the format of the NN output data is a three-channel (luma channel and two chroma channels) three dimensional data (3D tensor). It indicates that the output data of the NN filter is used in the 4:4:4 format as the luma channel and two chroma channels of the output image.

In a case that nnrpf_output_format_idc==3, the format of the NN output data is six channel (four luma channels and two chroma channels) three dimensional data (3D tensor). It indicates that the output data of the NN filter is used in the 4:2:0 format as one luma channel derived by integrating four channels out of six channels and two chroma channels.

Processing of Post-Filter SEI

In processing of post-filter SEI, the header coder 1110 and the header decoder 3020 may set syntax values and variables of the image decoding apparatus to variables for filter processing.

PicWidthInLumaSamples=pps_pic_width_in_luma_samples

PicHeightInLumaSamples=pps_pic_height_in_luma_samples

ChromaFormatIdc=sps_chroma_format_idc

BitDepthY=BitDepthC=BitDepth

ComponentSample [cIdx] is a two dimensional array storing the cIdx-th decoded pixel value of the decoded image.

Here, pps_pic_width_in_luma_samples, pps_pic_height_in_luma_samples, and sps_chroma_format_idc are syntax values indicating the image width, height, and sub-sampling of color components, and BitDepth is the bit depth of the image.

The header coder 1110 and the header decoder 3020 derive the following variables according to ChromaFormatIdc.

SubWidthC=1, SubHeghtC=1 (ChromaFormatIdc==0)
SubWidthC=2, SubHeghtC=2 (ChromaFormatIdc==1)
SubWidthC=2, SubHeghtC=1 (ChromaFormatIdc==2)
SubWidthC=1, SubHeghtC=1 (ChromaFormatIdc==3)

The header coder 1110 and the header decoder 3020 derive the width and the height of the luma image to be filtered and the width and the height of the chroma image to be filtered, using the following variables.

LumaWidth=PicWidthInLumaSamples
LumaHeight=PicHeightInLumaSamples
ChromaWidth=PicWidthInLumaSamples/SubWidthC
ChromaHeight=PicHeightInLumaSamples/SubHeithtC
SW=SubWidthC
SH=SubHeightC
SubWidthC(=SW) and SubHeightC(=SH) indicate sub-sampling of color components. Here, the variables represent the ratio of resolution of chrominance to luminance.

The header coder 1110 and the header decoder 3020 may derive the output image width outWidth and the output image height outHeight according to a scale value indicating a ratio as follows:

outLumaWidth=LumaWidth*scale
outLumaHeight=LumaHeight*scale
outChromaWidth=LumaWidth*scale/outSW
outChromaHeight=LumaHeight*scale/outSH
outSW and outSH are chroma sub-sampling values of the output image.

Conversion of Post Filter into NN Input Data

When image data is input to the NN filter, the NN filter unit 611 converts a decoded image into NN input data inputTensor [ ][ ][ ] which is a three dimensional array based on the value of nnrpf_input_format_idc as illustrated in FIG. 17 and below.

Hereinafter, x and y represent the coordinates of a luma pixel. For example, in ComponentSample, the ranges of x and y are x=0 . . . LumaWidth−1 and y=LumaHeight−1, respectively. cx and cy represent the coordinates of a chroma pixel, and the ranges of cx and cy are cx=0 . . . ChromaWidth−1 and cy=ChromaHeight−1, respectively. The NN filter unit 611 described below processes these ranges.

In a case that nnrpf_input_format_idc is 0 (pfp_component_idc==0), the NN filter unit 611 derives inputTensor as follows:

inputTensor[0][y][x]=ComponentSample [0][x][y]

In a case that nnrpf_input_format_idc is 1 (pfp_component_idc==1), inputTensor is derived as follows:

inputTensor[0][cy][cx]=ComponentSample[1][cx][cy]
inputTensor[1][cy][cx]=ComponentSample[2][cx][cy]
The following may be employed.

inputTensor[0][y/SH][x/SW]=ComponentSample[1][x/SW][y/SH]

inputTensor[1][y/SH][x/SW]=ComponentSample[2][x/SW][y/SH]

In a case that nnrpf_input_format_idc is 2 (pfp_component_idc==2), inputTensor is derived as follows:

inputTensor[0][y][x]=ComponentSample[0][x][y]

ChromaOffset=1<<(BitDepthC−1)

inputTensor[1][y][x]=ChromaFormatIdc==0 ?ChromaOffset:ComponentSample[1][x/SW][y/SH]

inputTensor[2][y][x]=ChromaFormatIde==0 ?ChromaOffset:ComponentSample[2][x/SW][y/SH]

In a case that nnrpf_input_format_idc is 3, inputTensor is derived as follows:

inputTensor[0][cy][cx]=ComponentSample[0][cx*2][cy*2]

inputTensor[1][cy][cx]=ComponentSample[0][cx*2+1][cy*2]

inputTensor[2][cy][cx]=ComponentSample[0][cx*2][cy*2+1]

inputTensor[3][cy][cx]=ComponentSample[0][cx*2+1][cy*2+1]

ChromaOffset=1<<(BitDepthC−1)

inputTensor[4][cy][cx]=ChromaFormatIde==0 ?ChromaOffset:ComponentSample[1][cx][cy]

inputTensor[5][cy][cx]=ChromaFormatIde==0 ?ChromaOffset:ComponentSample[2][cx][cy]

In a case that ChromaFormatIde is 0, ComponentSample is an image of the luma channel only. At this time, the NN filter unit 611 may set, in the chroma data portion of inputTensor, the constant ChromaOffset derived from the bit depth. ChromaOffset may have another value such as 0. Alternatively, as indicated in parentheses, the NN input data may be derived according to pfp_component_idc described later.

FIG. 20 is a diagram illustrating a relationship between the number of channels of a tensor and conversion processing.

Furthermore, the NN filter unit 611 may derive the NN input data in accordance with the number of channels NumInChannels (numTensors) of the input tensor as follows:

In a case that NumInChannels==1, inputTensor is derived as follows:

inputTensor[0][y][x]=ComponentSample[0][x][y]

In a case that NumInChannels==2, inputTensor is derived as follows:

inputTensor[0][cy][cx]=ComponentSample[1][cx][cy]

inputTensor[1][cy][cx]=ComponentSample[2][cx][cy]

The following may be employed.

inputTensor[0][y/SH][x/SW]=ComponentSample[1][x/SW][y/SH]

inputTensor[1][y/SH][x/SW]=ComponentSample[2][x/SW][y/SH]

In a case that NumInChannels==3, inputTensor is derived as follows:

inputTensor[0][y][x]=ComponentSample[0][x][y]

ChromaOffset=1<<(BitDepthC−1)

inputTensor[1][y][x]=ChromaFormatIdc==0 ?ChromaOffset:ComponentSample[1][x/SW][y/SH]

inputTensor[2][y][x]=ChromaFormatIdc==0 ?ChromaOffset:ComponentSample[2][x/SW][y/SH]

In a case that NumInChannels==6, inputTensor is derived as follows:

inputTensor[0][cy][cx]=ComponentSample[0][cx*2][cy*2]

inputTensor[1][cy][cx]=ComponentSample[0][cx*2+1][cy*2]

inputTensor[2][cy][cx]=ComponentSample[0][cx*2][cy*2+1]

inputTensor[3][cy][cx]=ComponentSample[0][cx*2+1][cy*2+1]

ChromaOffset=1<<(BitDepthC−1)

inputTensor[4][cy][cx]=ChromaFormatIdc==0 ?ChromaOffset:ComponentSample[1][cx][cy]

inputTensor[5][cy][cx]=ChromaFormatIdc==0 ?ChromaOffset:ComponentSample[2][cx][cy]

As described above, the video decoding apparatus is provided that includes the prediction image derivation unit that decodes a prediction image and the residual decoder that decodes a residual, wherein the input tensor is derived from the parameter indicating the number of channels of the input tensor and the output tensor of the neural network model, or an image is derived from the output tensor. This is effective in allowing the input tensor to be reliably and easily derived.

The NN filter unit 611 separates a one-channel luma image into four channels depending on the pixel position and converts the channels into input data. The NN filter unit 611 may perform the derivation as follows: In the description below, differences between 4:2:0 and 4:2:2 and 4:4:4 are absorbed by a variable indicating chroma sub-sampling, and can thus be processed regardless of differences among chroma samples.

inputTensor[0][cy][cx]=ComponentSample [0][cx*2][cy*2]

inputTensor[1][cy][cx]=ComponentSample [0][cx*2+1][cy*2]

inputTensor[2][cy][cx]=ComponentSample [0][cx*2][cy*2+1]

inputTensor[3][cy][cx]=ComponentSample [0][cx*2+1][cy*2+1]

ChromaOffset=1<<(BitDepthC−1)

inputTensor[4][cy][cx]=ChromaFormatIdc==0 ?ChromaOffset:ComponentSample[1][cx*2/SW][cy*2/SH]

inputTensor[5][cy][cx]=ChromaFormatIdc==0 ?ChromaOffset:ComponentSample [2][cx*2/SW][cy*2/SH]

cx=x/2 and cy=y/2, and thus for the range of x and y described above, the NN filter unit 611 may perform the derivation as follows:

inputTensor[0][y/2][x/2]=ComponentSample[0][x/2*2][y/2*2]

inputTensor[1][y/2][x/2]=ComponentSample[0][x/2*2+1][y/2*2]

inputTensor[2][y/2][x/2]=ComponentSample[0][x/2*2][y/2*2+1]

inputTensor[3][y/2][x/2]=ComponentSample[0][x/2*2+1][y/2*2+1]

ChromaOffset=1<<(BitDepthC−1)

inputTensor[4][y/2][x/2]=ChromaFormatIdc==0 ?ChromaOffset:ComponentSample[1][x/SW][y/SH]

inputTensor[5][y/2][x/2]=ChromaFormatIdc==0 ?ChromaOffset:ComponentSample[2][x/SW][y/SH]

Conversion from NN Output Data of Post-Filter

Based on the value of nnrpf_output_format_idc, the NN filter unit 611 derives the output image outSamples from the NN output data outputTensor [ ][ ][ ] of the three dimensional array, which is the output data of the NN filter. To be more specific, as illustrated in FIG. 18 and below, the NN filter unit 611 derives the image as follows based on the value of nnrpf_output_format_idc and the chroma subsampling values outSW and outSH of the output image. Note that outSW and outSH use values derived based on OutputChromaFormatIdc decoded from the coded data. Hereinafter, x and y represent coordinates of a luma pixel of the output image. For example, in outputTensor, the ranges of x and y are x=0 . . . outLumaWidth−1 and y=outLumaHeight−1, respectively. cx and cy represent the coordinates of a chroma pixel of the output image, and the ranges of cx and cy are cx=0 . . . outChromaWidth−1 and cy=0 . . . outChromaHeight−1, respectively. The NN filter unit 611 described below processes these ranges. outSamplesL, outSamplesCb, and outSamplesCr represent a luma channel, a chroma (Cb) channel, and a chroma (Cr) channel of the output image, respectively.

In a case that nnrpfoutput_format_idc is 0, the NN filter unit 611 derives outSamplesL as follows:

outSamplesL[x][y]=outputTensor[0][y][x]

In a case that nnrpfoutput_format_idc is 1, outSamplesCb and outSamplesCr are derived as follows:

outSamplesCb[cx][cy]=outputTensor[0][cy][cx]
outSamplesCr[cx][cy]=outputTensor[1][cy][cx]

In a case that nnrpfoutput_format_idc is 2, outSamplesL, outSamplesCb and outSamplesC are derived as follows:

outSamplesL[x][y]=outputTensor[0][y][x]
outSamplesCb[x/outSW][y/outSH]=outputTensor[1][y][x]
outSamplesCr[x/outSW][y/outSH]=outputTensor[2][y][x]

Alternatively, outSamplesCb and outSamplesCr may be derived as follows:

outSamplesCb[cx][cy]=outputTensor[1][cy*outSH][cx*outSW]
outSamplesCr[cx][cy]=outputTensor[2][cy*outSH][cx*outSW]

In a case that nnrpfoutput_format_idc is 3, outSamplesL is derived as follows:

outSamplesL[x/2*2][y/2*2]=outputTensor[0][y/2][x/2]
outSamplesL[x/2*2+1][y/2*2]=outputTensor[1][y/2][x/2]
outSamplesL[x/2*2][y/2*2+1]=outputTensor[2][y/2][x/2]
outSamplesL[x/2*2+1][y/2*2+1]=outputTensor[3][y/2][x/2]

Alternatively, outSamplesL may be derived as follows:

outSamplesL[cx*2][cy*2]=outputTensor[0][cy][cx]
outSamplesL[cx*2+1][cy*2]=outputTensor[1][cy][cx]
outSamplesL[cx*2][cy*2+1]=outputTensor[2][cy][cx]
outSamplesL[cx*2+1][cy*2+1]=outputTensor[3][cy][cx]

Further, in a case that nnrpf_output_format_idc is 3, and the output image is in the 4:2:0 format (ChromaFormatIdc of the output image is 1 and SW=SH=2), outSamplesCb and outSamplesCr are derived as follows:

outSamplesCb[cx][cy]=outputTensor[4][cy][cx]
outSamplesCr[cx][cy]=outputTensor[5][cy][cx]

Alternatively, in a case that the output image is in the 4:2:2 format (ChromaFormatIde of the output image is 2, SW=2, SH=1), outSamplesCb and outSamplesCr are derived as follows:

outSamplesCb[cx][cy/2*2]=outputTensor[4][cy][cx]
outSamplesCb[cx][cy/2*2+1]=outputTensor[4][cy][cx]
outSamplesCr[cx][cy/2*2]=outputTensor[5][cy][cx]
outSamplesCr[cx][cy/2*2+1]=outputTensor[5][cy][cx]

Alternatively, in a case that the output image is in the 4:4:4 format (ChromaFormatIdc of the output image is 3, SW=SH=1), outSamplesCb and outSamplesCr are derived as follows:

outSamplesCb[cx/2*2][cy/2*2]=outputTensor[4][cy][cx]
outSamplesCb[cx/2*2+1][cy/2*2+1]=outputTensor[4][cy][cx]
outSamplesCr[cx/2*2][cy/2*2]=outputTensor[5][cy][cx]
outSamplesCr[cx/2*2+1][cy/2*2+1]=outputTensor[5][cy][cx]

Alternatively, outSamplesCb and outSamplesCr may be derived as follows:

for (j=0; j<outSH; j++)
    for (i=0; i<outSW; i++)
        outSamplesCb[cx/outSW*outSW+i][cy/outSH*outSH+j]=outputTensor[4][cy][cx]
        outSamplesCr            [cx/outSW*outSW+I][cy/outSH*outSH+j]=outputTensor [5][cy][cx], and in the case of the YUV4:2:0 format, cx=x/2 and cy=y/2. Consequently, the NN filter unit 611 may derive outSamplesL, outSamplesCb, and outSamplesCr as follows:

outSamplesL[x/2*2][y/2*2]=outputTensor[0][y/2][x/2]
outSamplesL[x/2*2+1][y/2*2]=outputTensor[1][y/2][x/2]
outSamplesL[x/2*2][y/2*2+1]=outputTensor[2][y/2][x/2]
outSamplesL[x/2*2+1][y/2*2+1]=outputTensor[3][y/2][x/2]
outSamplesCb[x/outSW][y/outSH]=outputTensor[4][y/2][x/2]
outSamplesCr[x/outSW][y/outSH]=outputTensor[5][y/2][x/2]

Note that outSW and outSH may be set in the same manner as in the chroma sampling of the input data and processed.

outSW=SW
outSW=SH

FIG. 20 is a diagram illustrating the relationship between the number of channels of a tensor and conversion processing.

Further, as described below, the NN filter unit 611 may derive the NN input data in accordance with the number of channels NumOutChannels (numTensors) of the output tensor as follows:

In a case that NumOutChannels is 1, outSamplesL is derived as follows:

outSamplesL[x][y]=outputTensor[0][y][x]

In a case that NumOutChannels is 2, outSamplesCb and outSamplesCr are derived as follows:

outSamplesCb[cx][cy]=outputTensor[0][cy][cx]
outSamplesCr[cx][cy]=outputTensor[1][cy][cx]

In a case that NumOutChannels is 3, outSamplesL, outSamplesCb, and outSamplesCr are derived as follows:

outSamplesL[x][y]=outputTensor[0][y][x]
outSamplesCb[x/outSW][y/outSH]=outputTensor[1][y][x]
outSamplesCr[x/outSW][y/outSH]=outputTensor[2][y][x]

Alternatively, outSamplesCb and outSamplesCr may be derived as follows:

outSamplesCb[cx][cy]=outputTensor[1][cy*outSH][cx*outSW]
outSamplesCr[cx][cy]=outputTensor[2][cy*outSH][cx*outSW]

In a case that NumOutChannels is 6, outSamplesL, outSamplesCb, and outSamplesCr are derived as follows:

outSamplesL[x/2*2][y/2*2]=outputTensor[0][y/2][x/2]
outSamplesL[x/2*2+1][y/2*2]=outputTensor[1][y/2][x/2]

outSamplesL[x/2*2][y/2*2+1]=outputTensor[2][y/2][x/2]

outSamplesL[x/2*2+1][y/2*2+1]=outputTensor[3][y/2][x/2]

outSamplesCb[x/outSW][y/outSH]=outputTensor[4][y/2][x/2]

outSamplesCr[x/outSW][y/outSH]=outputTensor[5][y/2][x/2]

Second Embodiment

FIG. 19 is a diagram illustrating another embodiment of the syntax table of the NN filter SEI. In this embodiment, the syntax element nnrpf_additional_input_idc is used in addition to the syntax element nnrpf_io_idc in NPL 3. This is effective in allowing the conversion method to be flexibly specified even in a case that the number of types of input and output increases to increase the number of combinations of inputs and outputs. Note that description of the same portions of the second embodiment as those of the first embodiment is omitted.

The header decoder 3020 decodes the input/output image information nnrpf_io_idc and the additional input information nnrpf_additional_info_idc in a case that nnrpf_mode_idc is 1 or 2 (indicating that the SEI is data of a new post-filter) as illustrated in FIG. 19.

The header decoder 3020 derives the formats of the input tensor and the output tensor of the model based on the value of nnrpf_io_idc as follows:

In a case that nnrpf_io_idc==0: numInChannels=numOutChannels=1

In a case that nnrpf_io_idc==1: numInChannels=numOutChannels=2

In a case that nnrpf_io_idc==2: numInChannels=numOutChannels=3

In a case that nnrpf_io_idc==3: numInChannels=numOutChannels=4

In a case that nnrpf_io_idc==4: numInChannels=numOutChannels=6

In the present embodiment, numInChannels and numOutChannels are derived in such a manner as to have an equal value. However, the association of nnrpf_io_idc with numInChannles and numOutChannels is not limited to this derivation, and other combinations may be used. The number of channels may be directly decoded without using nnrpf_io_idc. The conversion processing may be performed using the same variables numInOutChannels and numTensors without distinguishing between numInChannels and numOutChannels.

Further, based on the value of nnrpf_additional_info_idc, the header decoder 3020 derives the values of variables useSliceQPY, usebSY, and usebSC indicating the use of input channels other than common image components for input and output. useSliceQPY, usebSY, and usebSC are flags respectively indicating whether SliceQPY, bSY, and bSCb and bSCr are used as additional input channels. In the present embodiment, one flag usebSC controls both bSCb and bSCr. Note that SliceQPY is a luma quantization parameter in a slice to which certain coordinates belong. An array of bSY, bSCb, and bSCR stores the respective values of the block strength of a deblocking filter at certain coordinates in the luma and chroma (Cb, Cr) channels of the decoded image. The flags described above are derived from nnrpf_additional_info_idc, for example, as follows:

In a case that nnrpf_additional_info_idc==0: useSliceQPY=0, usebSY=0, usebSC=0

In a case that nnrpf_additional_info_idc==1: useSliceQPY=1, usebSY=0, usebSC=0

In a case that nnrpf_additional_info_idc==2: useSliceQPY=0, usebSY=1, usebSC=0

In a case that nnrpf_additional_info_idc==3: useSliceQPY=1, usebSY=1, usebSC=0

In a case that nnrpf_additional_info_idc==4: useSliceQPY=0, usebSY=0, usebSC=1

In a case that nnrpf_additional_info_idc==5: useSliceQPY=1, usebSY=0, usebSC=1

In a case that nnrpf_additional_info_idc==6: useSliceQPY=0, usebSY=1, usebSC=1

In a case that nnrpf_additional_info_idc==7: useSliceQPY=1, usebSY=1, usebSC=1

Note that the association of nnrpf_additional_info_idc with useSliceQPY, usebSY, and usebSC is not limited to the derivations described above, and other combinations may be used.

Alternatively, each bit of nnrpf_additional_indo_idc may be associated with each flag and may be arithmetically derived as follows:

useSliceQPY=nnrpf_additional_info_idc&1 usebSY=(nnrpf_additional_info_idc>>1)&1 usebSC=(nnrpf_additional_info_idc>>2)&1

Alternatively, the header decoder 3020 may decode the flags useSliceQPY, usebSY, and usebSC from the coded data without coding nnrpf_additional_indo_idc.

Note that the types of flags are not limited to the above description, and flags may be derived for other information in the same manner. For example, a slice quantization parameter SliceQPC of chrominance, a QP value of a reference image, a prediction image, or a coding block unit may be used.

The header decoder 3020 further decodes nnrpf_patch_size_minus1 indicating the size (the number of pixels in the horizontal and vertical directions)−1 of the processing unit (patch) of the model indicated by the SEI. At this time, the variable patchSize representing the size of the patch is derived by the following equation.

patchSize=nnrpf_patch_size_minus1+1

Further, the header decoder 3020 decodes nnrpf_overlap. nnrpf_overlap indicates the width of the region that is adjacent to the patch and is input to the model together with the patch. In other words, the size of the height×width of the tensor input to the model is (nnrpf_overlap*2+patchSize)×(nnrpf_overlap*2+patchSize)pixels.

Another Example of Details of NN Filter Unit 611

The NN filter unit 611 according to the present exemplary embodiment performs three steps of STEP1: converting an image ComponentSample to an input tensor inputTensor, STEP2: applying filtering processing of a neural network postProcessingFilter to inputTensor and outputting outputTensor, and STEP3: deriving an image from the derived outputTensor.

SliceQPY is a luma quantization parameter qP in a slice to which certain coordinates belong. The array of bSY, bSCb, and bsCR stores the respective values of the strength (block Strength, bS) of the deblocking filter at certain coordinates in the luma and chroma (Cb, Cr) channels of the decoded image. bS may be a value derived from a prediction mode of a block, a motion vector, a difference value between pixel values, or the like in deblocking filter processing.

Pseudo Code

The NN filter unit 611 may perform processing of STEP1, STEP2, and STEP3 in a prescribed patch size unit from the upper left coordinates of the image. The following pseudo code outlines the processing on a patch-by-patch basis.

```
for(cTop = 0; cTop < PicHeightInLumaSamples; cTop += patchSize * rH) {
    for(cLeft = 0; cLeft < PicWidthInLumaSamples; cLeft += patchSize * rW) {
        <STEP1: Conversion of image and additional information into input tensor>
        <STEP2: Application of filtering processing>
        <STEP3: Conversion of output tensor into image>
    }
}
```

Here, rH and rW are variables for determining the increment amounts of loop variables related to the chroma sub-sampling. Further, rH and rW are magnifications in the vertical and horizontal directions for deriving the size of the tensor patch on the image.

The NN filter unit 611 may use the chroma sub-sampling to derive rH and rW as follows:

$$rH = SH$$

$$rW = SW$$

Alternatively, the NN filter unit 611 may derive rH and rW using the number of input channels of the tensor as follows:

$$rH = numInChannles == 6?2:1$$

$$rW = (numInChannles == 4 || numInChannels == 6)?2:1$$

Alternatively, the NN filter unit 611 may derive rW and rH using the chroma sub-sampling inside the tensor and the chroma sub-sampling of the input image, for example, by the following equations.

$$rH = numInChannels == 2?SH:numInChannels == 6?2:1$$

$$rW = numInChannels == 2?SW:(numInChannels == 4 \text{ II } numInChannels == 6)?2:1$$

rH and rW indicate that the tensor of the patch size (height×width) patchSize×patchSize corresponds to a region of patchSize*rW×patchSize*rH on the input luma image (width×height).

An example of processing from STEP1 to STEP3 will be described below.

STEP1

The NN filter unit 611 derives patches including an overlap. With the overlap portion included, the size of the input data is (patchSize+nnrpf_overlap*2) x (patchSize+ nnrpf_overlap*2) pixels in the vertical and horizontal directions. The NN filter unit 611 derives each element of one patch including an overlap in the input tensor as in the following pseudo code.

```
for (yP = –nnrpf_overlap; yP < patchSize + nnrpf_overlap; yP ++) {
    for (xP = –nnrpf_overlap; xP < patchSize + nnrpf_overlap; xP ++) {
        yP1 = yP + nnrpf_overlap
        xP1 = xP + nnrpf_overlap
        yT = Clip3(0, PicHeightInLumaSamples – 1, cTop + yP * rH)
        yL = Clip3(0, PicWidthInLumaSamples – 1, cLeft + xP * rW)
        yB = Clip3 (0, PicHeightInLumaSamples – 1, yT + rH – 1)
        xR = Clip3(0, PicWidthInLumaSamples – 1, yL + rW – 1)
        cy = yT/SH
```

-continued

```
        cx = yL/SW
        <Derivation of input tensor: Conversion of input image>
        <Derivation of input tensor: Conversion of additional information>
    }
}
``` yP and xP are loop variables in the height direction (H) and width direction (W) of the tensor. yP1 and xP1 are subscripts offset by the amount of an overlap to refer to an element of the input tensor that includes the overlap region. yT, yL, yB, and xR are coordinate values on the luma component corresponding to yP and xP in the patch to be processed. cy and cx are coordinate values on the chroma component of the input image corresponding to yP and xP in the patch to be processed. These variables may be derived as necessary in the middle of each of the processing operations described below.

Now, conversion processing for an input image will be described.

Conversion of Input Image

In the STEP1 loop, the NN filter unit 611 converts the input image according to the value of numInChannels and derives the values of the respective channels corresponding to the coordinates yP and xP of the tensor, as indicated by the following pseudo code.

```
    if (numInChannels == 1) {
        inputTensor[0][yP1][xP1] = ComponentSamples[0][yT][yL]
        ch_pos = 1
    }
    else if (numInChannels == 2) {
        inputTensor[0][yP1][xP1]
            = ChromaFormatIdc == 0 ?
ChromaOffset:ComponentSamples[1][cx][cy]
        inputTensor[1][yP1][xP1]
            = ChromaFormatIdc == 0 ?
ChromaOffset:ComponentSamples[2][cx][cy]
        ch_pos = 2
    }
    else if (numInChannels == 3) {
        inputTensor[0][yP1][xP1] = ComponentSamples[0][yT][yL]
        inputTensor[1][yP1][xP1]
            = ChromaFormatIdc == 0 ?
ChromaOffset:ComponentSamples[1][cx][cy]
        inputTensor[2][yP1][xP1]
            = ChromaFormatIdc == 0 ?
ChromaOffset:ComponentSamples[2][cx][cy]
        ch_pos = 3
    }
    else if (numInChannels == 4) {
        inputTensor[0][yP1][xP1] = ComponentSamples[0][yL][yT]
        inputTensor[1][yP1][xP1] = ComponentSamples[0][yL][yB]
        inputTensor[2][yP1][xP1]
            = ChromaFormatIdc == 0 ?
ChromaOffset:ComponentSamples[1][cx][cy]
        inputTensor[3][yP1][xP1]
            = ChromaFormatIdc == 0 ?
ChromaOffset:ComponentSamples[2][cx][cy]
        ch_pos = 4
    }
```

-continued

```
else if (numInChannels == 6) {
    inputTensor[0][yP1][xP1] = ComponentSamples[0][yL][yT]
    inputTensor[1][yP1][xP1] = ComponentSamples[0][xR][yT]
    inputTensor[2][yP1][xP1] = ComponentSamples[0][yL][yB]
    inputTensor[3][yP1][xP1] = ComponentSamples[0][xR][yB]
    inputTensor[4][yP1][xP1]
        = ChromaFormatIdc == 0 ?
ChromaOffset:ComponentSamples[1][cx][cy]
    inputTensor[5][yP1][xP1]
        = ChromaFormatIdc == 0 ?
ChromaOffset:ComponentSamples[2][cx][cy]
    ch_pos = 6
}
```

In the above description, the derivation may use ch_pos=numInChannels.

In the case of numInChannels==1, one-channel image data of the input tensor is derived from the luma component of the decoded image.

In the case of numInChannels==2, two-channel image data of the input tensor is derived from two chroma components of the decoded image.

In the case of numInChannels==3, 4:4:4 format image data represented by three channels is derived from the luma components and the chroma components of the decoded image and is set for the input tensor.

In the case of numInChannels==4, 4:2:2 format image data represented by a two-channel luma image and a two-channel chroma image is derived from the luma component and the chroma components of the decoded image, and is set for the input tensor.

In the case of numInChannels==6, 4:2:0 format image data represented by a four-channel luma image and a two-channel chroma image is derived from the luma components and the chroma components of the decoded image, and is set for the input tensor.

In any case, in a case that the decoded image includes no chroma components (ChromaFormatIdc==0), the NN filter unit 611 sets a ChromaOffset in the chroma channel.

ch_pos is a subscript indicating the next available channel in the input tensor. In a case that data is added to the input tensor, channels subsequent to the value of ch_pos may be used.

Derivation of Additional Information

Now, the NN filter unit 611 adds additional information to inputTensor based on the additional input information (flag). For example, in a case that useSliceQPY is true, the next channel of inputTensor (inputTensor [ch_pos]) is set equal to the value of SliceQPY. In a case that a value is set for a channel, the value of ch_pos is increased according to the number of channels used. Next, in a case that usebSY is true, the value of bSY at the position corresponding to the region of the patch is set for the next channel of inputTensor. Further, in a case that usebSC is true and the decoded image has a chroma component, the values of bSCb and bSCr at the position corresponding to the region of the patch are set for the next channel of inputTensor. At this time, the NN filter unit 611 may set the values of SliceQPY, bSY, bSCb, and bSCr without conversion, or may set values resulting from the conversion. A derivation example of the channel of additional information is provided below:

```
if (useSliceQPY) {
    inputTensor[ch_pos][yP1][xP1] = 2^((SliceQPY − 42)/6)
    ch_pos += 1
}
if (usebSY) {
    inputTensor[ch_pos][yP1][xP1] = Clip3(0,(1 << BitDepthY) − 1,
bSY[yL][yT] << (BitDepthY − 2))
    ch_pos += 1
}
if (usebSC && InputChromaFormatIdc != 0) {
    inputTensor[ch_pos][yP1][xP1] = Clip3(0,(1 << BitDepthC) − 1,
bSCb[cx][cy] << (BitDepthC − 2))
    ch_pos += 1
    inputTensor[ch_pos][yP1][xP1] = Clip3(0,(1 << BitDepthC) − 1,
bSCr[cx][cy] << (BitDepthC − 2))
    ch_pos += 1
}
```

As additional information other than the information described above, an example will be provided in which the NN filter unit 611 adds a second image different from the input image to the input tensor. The following example is processing performed in a case that a channel of a reference image refPicY is added using a flag useRefPicY:

```
if (useRefPicY) {
    inputTensor[ch_pos][yP1][xP1] = refPicY[yL][yT]
    ch_pos += 1
}
```

The flag useRefPicY may be derived from nnrpf_additional_info_idc as in the case of the flag of other additional information such as useSliceQPY, or may be decoded from the coded data.

Besides the reference image, the same applies to a case where a channel of the prediction image predPicY for one frame is added:

```
if (usePredPicY) {
    inputTensor[ch_pos][yP1][xP1] = predPicY[yL][yT]
    ch_pos += 1
}
```

Note that the manner of providing the additional information to the post-filter is not limited to that described above. Additional information may be derived as a parameter different from inputTensor and input to the post-filter processing.

STEP2

In STEP2, the NN filter unit 611 performs post-filter processing with the derived inputTensor as an input, and acquires an output tensor outputTensor as a result of the filter processing:

outputTensor=postProcessingFilter(inputTensor)

In the present embodiment, the size of the output tensor outputTensor in the height direction (H)×width direction (W) is patchSize×patchSize, and is assumed to include no overlap region. However, the present invention is not limited to the above-described size, and an output tensor including an overlap region may be cropped to the size of patchSize× patchSize for use.

STEP3

In STEP3, the NN filter unit 611 derives image data from the output tensor outputTensor. The NN filter unit 611 derives, from the data of the output tensor outputTensor, the pixel values of the components outSamplesL, outSamplesCb, and outSamplesCr of the output image. At this time, the image data is derived based on the number of channels (data format) of the output tensor and the chroma subsampling of the output image as indicated by the pseudo code below. The following pseudo code is an example of STEP3 processing:

```
for(yP = 0, ySrc = cTop; yP < patchSize; yP ++, ySrc += rH)
    for(xP = 0, xSrc = cLeft; xP < patchSize; xP ++, xSrc += rW) {
        if (numOutChannels == 1) { // rW = 1, rH = 1
            if (pfp_component_idc != 1) {
                outSamplesL[xSrc][ySrc] = outputTensor[0][yP][xP]
            } else {
                outSamplesL[xSrc][ySrc] = ComponentSamples[0][xSrc][ySrc]
            }
            if (OutputChromaFormatIdc != 0 && pfp_component_idc != 0) {
                cyOut = ySrc/outSH
                cxOut = xSrc/outSW
                outSamplesCb[cxOut][cyOut] =
ComponentSamples[1][ySrc/SH][xSrc/SW]
                outSamplesCr[cxOut][cyOut] =
ComponentSamples[2][ySrc/SH][xSrc/SW]
            }
        }
        else if (numOutChannels == 2) { // rW = SW,rH = SH
            for (dy = 0; dy < rH; dy ++) {
                for (dx = 0; dx < rW; dx ++)
                    outSamplesL[ySrc + dy][xSrc + dx] =
ComponentSamples[0][ySrc + dy][xSrc + dx]
                    if (OutputChromaFormatIdc != 0) {
                        cyOut = (ySrc + dy)/outSH
                        cxOut = (xSrc + dx)/outSW
                        if (pfp_component_idc != 0) {
                            outSamplesCb[cxOut][cyOut] =
outputTensor[0][yP][xP]
                            outSamplesCr[cxOut][cyOut] =
outputTensor[1][yP][xP]
                        } else {
                            outSamplesCb[cxOut][cyOut] =
ComponentSamples[1][(ySrc + dy)/SH][(xSrc + dx)/SW]
                            outSamplesCr[cxOut][cyOut] =
ComponentSamples[2][(ySrc + dy)/SH][(xSrc + dx)/SW]
                        }
                    }
            }
        }
        else if (numOutChannels == 3) { // rW = 1, rH = 1
            if (pfp_component_idc != 1) {
                outSamplesL[xSrc][ySrc] = outputTensor[0][yP][xP]
            } else {
                outSamplesL[xSrc][ySrc] = ComponentSamples[0][xSrc][ySrc]
            }
            if (OutputChromaFormatIdc != 0) {
                cyOut = ySrc/outSH
                cxOut = xSrc/outSW
                if (pfp_component_idc != 0) {
```

-continued

```
            outSamplesCb[cxOut][cyOut] = outputTensor[1][yP][xP]
            outSamplesCr[cxOut][cyOut] = outputTensor[2][yP][xP]
        } else {
            outSamplesCb[cxOut][cyOut] =
ComponentSamples[1][xSrc/SW][ySrc/SH]
            outSamplesCr[cxOut][cyOut] =
ComponentSamples[2][xSrc/SW][ySrc/SH]
        }
    }
}
    else if (numOutChannels == 4) { // rW = 2, rH = 1
        if (pfp_component_idc != 1) {
            outSamplesL[xSrc][ySrc] = outputTensor[0][yP][xP]
            outSamplesL[xSrc + 1][ySrc] = outputTensor[1][yP][xP]
        } else {
            outSamplesL[xSrc][ySrc] = ComponentSamples[0][xSrc][ySrc]
            outSamplesL[xSrc + 1][ySrc] = ComponentSamples[0][xSrc +
1][ySrc]
        }
        if (OutputChromaFormatIdc != 0) {
            for (dx = 0; dx < rW; dx ++) {
                cyOut = (ySrc + dy)/outSH
                cxOut = (xSrc + dx)/outSW
                if (pfp_component_idc != 0) {
                    outSamplesCb[cxOut][cyOut] = outputTensor[2][yP][xP]
                    outSamplesCr[cxOut][cyOut] = outputTensor[3][yP][xP]
                } else {
                    outSamplesCb[cxOut][cyOut] =
ComponentSamples[1][(xSrc + dx)/SW][(ySrc + dy)/SH]
                    outSamplesCr[cxOut][cyOut] =
ComponentSamples[2][(xSrc + dx)/SW][(ySrc + dy)/SH]
                }
            }
        }
    }
    else if (numOutChannels == 6) { // rW = 2, rH = 2
        if (pfp_component_idc != 1) {
            outSamplesL[xSrc][ySrc] = outputTensor[0][yP][xP]
            outSamplesL[xSrc + 1][ySrc] = outputTensor[1][yP][xP]
            outSamplesL[xSrc][ySrc + 1] = outputTensor[2][yP][xP]
            outSamplesL[xSrc + 1][ySrc + 1] = outputTensor[3][yP][xP]
        } else {
            outSamplesL[xSrc][ySrc] = ComponentSamples[0][xSrc][ySrc]
            outSamplesL[xSrc + 1][ySrc] = ComponentSamples[0][xSrc +
1][ySrc]
            outSamplesL[xSrc][ySrc + 1] = ComponentSamples[0][xSrc][ySrc
+ 1]
            outSamplesL[xSrc + 1][ySrc + 1] = ComponentSamples[0][xSrc +
1][ySrc + 1]
        }
        if (OutputChromaFormatIdc != 0) {
            for (dy = 0; dy < rH; dy ++) {
                for (dx = 0; dx < rW; dx ++) {
                    cyOut = (ySrc + dy)/outSH
                    cxOut = (xSrc + dx)/outSW
                    if (pfp_component_idc != 0) {
                        outSamplesCb[cxOut][cyOut] =
outputTensor[4][yP][xP]
                        outSamplesCr[cxOut][cyOut] =
outputTensor[5][yP][xP]
                    } else {
                        outSamplesCb[cxOut][cyOut] =
ComponentSamples[1][(xSrc + dx)/SW][(ySrc + dy)/SH]
                        outSamplesCr[cxOut][cyOut] =
ComponentSamples[2][(xSrc + dx)/SW][(ySrc + dy)/SH]
                    }
                }
            }
        }
    }
}
}
```

In a case that numOutChannels is 1, the NN filter unit 611 derives the luma component of the output image by using one channel of outputTensor. In a case that the output image includes a chroma component, the NN filter unit 611 copies the chroma component of the input image for use.

In a case that the numOutChannels is 2, the NN filter unit 611 derives two chroma components of the output image using two channels of outputTensor. The NN filter unit 611 uses the luma component of the input image as the luma component of the output image.

In a case that the numOutChannels is 3, the NN filter unit 611 derives the luma component and the two chroma components of the output image by using outputTensor.

In a case that numOutChannels is 4, the NN filter unit 611 derives the luma component of the output image by using certain two channels of outputTensor and derives two chroma components by using the other two channels.

In a case that numOutChannels is 6, the NN filter unit 611 derives the luma component of the output image by using certain four channels of outputTensor, and derives two chroma components using the other two channels.

In any case of numOutChannels, the chroma channels of the output tensor are not processed in a case that the output image has no chroma components. In a case that numOutChannels is 2 or more, and chroma channels are included, conversion is performed to adapt to the chroma component format of the output image by using values outSH and outSW derived from chroma sub-sampling of the output image. In a case that numOutChannels is 2, conversion is performed to adapt to the chroma component format of the output image by referencing values SH (SubHightC) and SW(SubWidthC) derived from the chroma sub-sampling of the input image.

Further, in a case that numOutChannels is other than 2 and pfp_component_idc is 1, the luma component of the input image is used without updating the luma component of the output image by the output tensor. Similarly, in a case that numOutChannels is other than 1 and pfp_component_idc is 0, the chroma component of the input image is used without updating the chroma component of the output image by the output tensor.

In this way, the NN filter unit 611 derives the pixel value of each component of the output image based on the number of channels of the output tensor and the chroma sub-sampling of the output image. The NN filter unit 611 derives rW*rH pixels on the output image corresponding to one pixel of the output tensor represented by yP and xP. This may be processed by using the loop (dy, dx) as in a case that numOutChannels in the pseudo code is 2 or 6, or the loop may be omitted or expanded as in other cases. Alternatively, both dy and dx may be always looped twice.

In the above-described example, the NN filter unit 611 may perform derivation multiple times for the same chroma coordinates of the output image. However, in a case that the coordinates overlap, the second and subsequent derivations may be omitted.

Further, in the above example, cTop and cLeft are configured to increment by patchSize*rH and by patchSize*rW, respectively, as coordinate values on the image, but the present invention is not limited to this configuration. cTop and cLeft may be configured, using the chroma sub-sampling of the input image, as loops in which cTop and cLeft respectively increment by patchSize*SH and by patchSize*SW, or may be configured as loops in which cTop and cLeft always increment by 1 or 2. Similarly, ySrc and xSrc are configured as coordinate values on the image that respectively increment by rH and by rW, but the present invention is not limited to this configuration. ySrc and xSrc may be configured, using the chroma sub-sampling of the input image, as loops in which ySrc and xSrc respectively increment by SH and by SW, may be configured, using the chroma sub-sampling of the output image, as loops in which ySrc and xSrc respectively increment by outSH and by outSW, or may be configured as loops in which ySrc and xSrc always increment by 1.

As described above, the video decoding apparatus is provided that includes the prediction image derivation unit that decodes a prediction image, and the residual decoder that decodes a residual, wherein the video decoding apparatus decodes input/output image information indicating the number of channels of an input tensor and an output tensor of a neural network model and additional input information, derives a part of the input tensor from a first image using the input/output image information, and further derives a second image different from the first image using the additional input information, or another part of the input tensor using coding information related to the derivation of the prediction image or decoding of the residual. This is effective in transmitting the properties and features of the input image to the neural network model in further detail, allowing filtering effects to be improved.

Further, as described above, loop processing is performed in a raster scan manner by changing the addition value of the loop variable by using the parameter of the chroma sub-sampling, the input tensor is derived from the image in the loop, the deep learning filter is applied to the input tensor, and the output tensor is derived. This is effective in using the same processing to derive the input tensor for the cases of different color sampling.

CONCLUSION

The present application may be configured to decode coded data including an input tensor identification parameter indicating the correspondence relationship between the channel and the color component of the input tensor of the neural network model.

The present application may be configured in such a manner that a relational expression for deriving the input tensor from the input image is defined according to the input tensor identification parameter and the chroma sub-sampling of the input image.

The input tensor identification parameter of the present application may be configured to indicate any one of 1 channel, 2 channels, 3 channels, and 6 channels.

The present application may include means for deriving the input tensor from the input image according to the input tensor identification parameter.

The present application may be configured to decode coded data including an output tensor identification parameter indicating the correspondence relationship between the channel and the color component of the output tensor of the neural network model.

The present application may be configured in such a manner that a relational expression for deriving the output image from the output tensor is defined according to the output tensor identification parameter and the chroma sub-sampling of the output image.

The output tensor identification parameter of the present application may be configured to indicate any one of 1 channel, 2 channels, 3 channels, and 6 channels.

The present application may include means for deriving the output image from the output tensor according to the output tensor identification parameter.

As described above, the present SEI includes information regarding the format of input data of the NN filter and the format of output data of the NN filter. This is effective in allowing easy selection, without reading and analyzing a model, of a method of appropriately converting a decoded image into input data of the NN filter or a method of appropriately converting output data of the NN filter into an output image.

Configuration for Deriving Input Tensor Identification Parameter and Output Tensor Parameter Note that the NN filter unit 611 may derive the input tensor identification parameter and the output tensor identification parameter from the topology of the NN model decoded from coded data or the like or identified by a URI or the like, instead of decoding the input tensor identification parameter and the output tensor identification parameter from the additional data.

The NN filter unit 611 derives nnrpf_input_format_idc according to the number of channels NumInChannels of the input data inputTensor of the NN model as follows:

For one channel, nnrpf_input_format_idc=0

For two channels, nnrpf_input_format_idc=1

For three channels, nnrpf_input_format_idc=2

For six channels, nnrpf_input_format_idc=3

The NN filter unit 611 derives nnrpf_output_format_idc in accordance with the channel number NumOutChannels of the output data outputTensor of the NN model as follows:

For one channel, nnrpf_output_format_idc=0

For two channels, nnrpf_output_format_idc=1

For three channels, nnrpf_output_format_idc=2

For 6 channels, nnrpf_output_format_idc=3

According to the above configuration, the NN filter unit 611 analyzes the number of dimensions of the input data and the output data of the NN model transmitted or indicated by the coded data, and performs conversion from the input image to the input tensor and conversion from the output tensor to the output image in accordance with the analysis result (the input tensor identification parameter and the output tensor identification parameter). This is effective in specifying the relationship between the color component and the channel, which is not indicated by the NN model itself, and preparing NN input data, allowing the output image to be obtained from the NN output data. Note that the present SEI may include information regarding the neural network model complexity.

Configuration of Image Coding Apparatus

Figure 6:
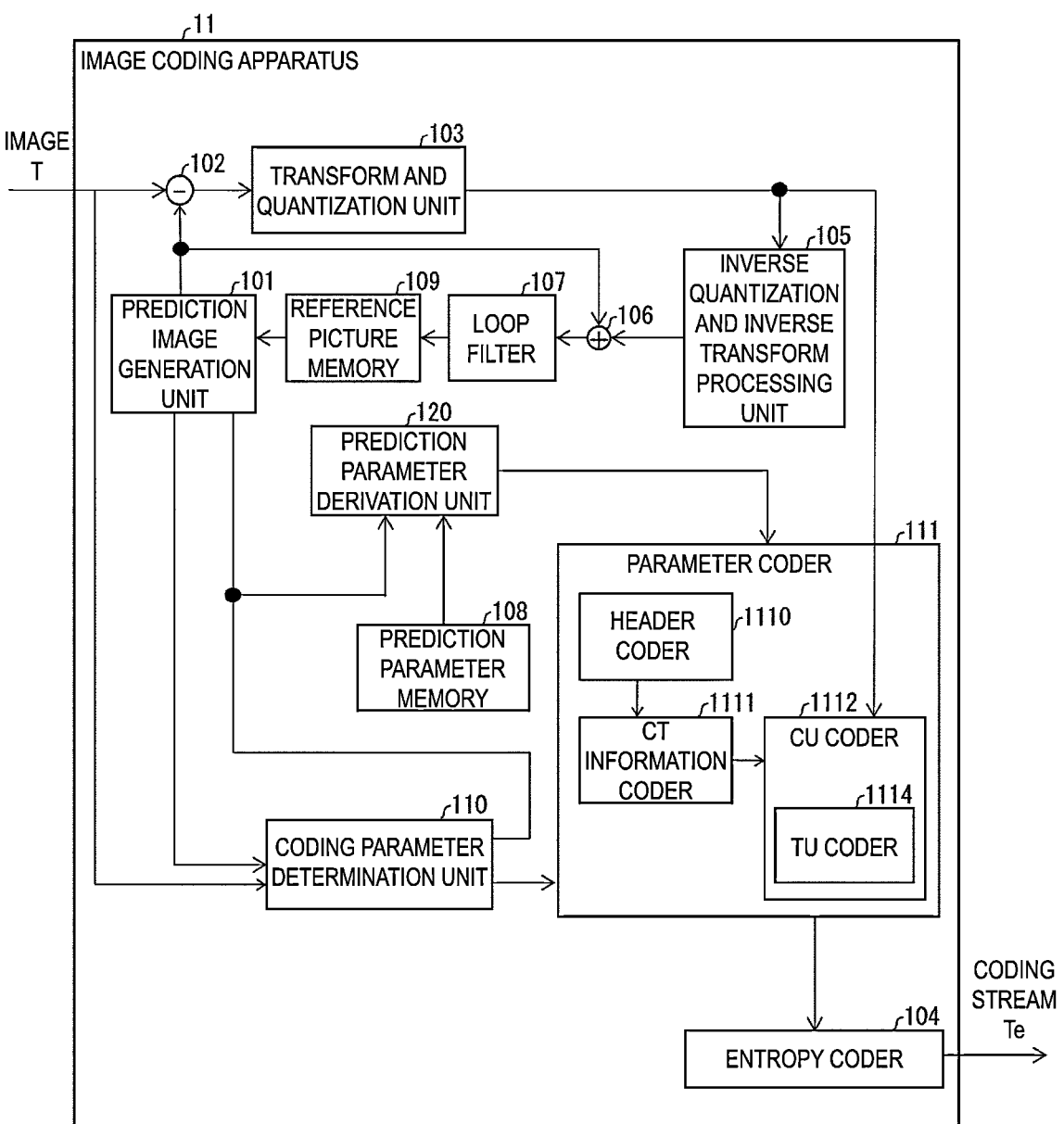
FIG. 6 is a block diagram illustrating a configuration of an image coding apparatus.

Next, a configuration of the image coding apparatus 11 according to the present embodiment will be described. FIG. 6 is a block diagram illustrating a configuration of the image coding apparatus 11 according to the present embodiment. The image coding apparatus 11 is configured to include a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit or a frame memory) 108, a reference picture memory (a reference image storage unit or a frame memory) 109, a coding parameter determination unit 110, a parameter coder 111, a prediction parameter derivation unit 120, and an entropy coder 104.

The prediction image generation unit 101 generates a prediction image for each CU. The prediction image generation unit 101 includes the inter prediction image generation unit 309 and intra prediction image generation unit 310 already described, and description of these units is omitted.

The subtraction unit 102 subtracts a pixel value of the prediction image of a block input from the prediction image generation unit 101 from a pixel value of an image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantized transform coefficient by quantization.

The transform and quantization unit 103 outputs the quantized transform coefficient to the parameter coder 111 and the inverse quantization and inverse transform processing unit 105.

The inverse quantization and inverse transform processing unit 105 is the same as the inverse quantization and inverse transform processing unit 311 (FIG. 4) of the image decoding apparatus 31, and description thereof is omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. General operation of each module will be described below.

The header coder 1110 performs coding processing of parameters such as header information, split information, prediction information, and quantized transform coefficients.

The CT information coder 1111 codes the QT and MT (BT, TT) split information and the like.

The CU coder 1112 codes the CU information, the prediction information, the split information, and the like.

In a case that a prediction error is included in the TU, the TU coder 1114 codes the QP update information and the quantization prediction error.

The CT information coder 1111 and the CU coder 1112 supply, to the parameter coder 111, syntax elements such as an inter prediction parameter, an intra prediction parameter, and the quantized transform coefficient.

The parameter coder 111 inputs the quantized transform coefficients and the coding parameters (split information and prediction parameters) to the entropy coder 104. The entropy coder 104 performs entropy coding of the coefficients and parameters to generate and output coded data Te.

The prediction parameter derivation unit 120 is a component including the inter prediction parameter coder 112 and the intra prediction parameter coder 113, and derives an intra prediction parameter and an intra prediction parameter from the parameters input from the coding parameter determination unit 110. The derived intra prediction parameter and inter prediction parameter are output to the parameter coder 111.

The addition unit 106 adds, for each pixel, the pixel value for the prediction block input from the prediction image generation unit 101 and the prediction error input from the inverse quantization and inverse transform processing unit 105 to generate a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may include only a deblocking filter, for example.

The prediction parameter memory 108 stores the prediction parameters generated by the coding parameter determination unit 110 at a predetermined position for each target picture and CU.

The reference picture memory 109 stores the decoded image generated by the loop filter 107 at a predetermined position for each target picture and CU.

The coding parameter determination unit 110 selects one set among multiple sets of coding parameters. The coding parameters include QT, BT, or TT split information described above, a prediction parameter, or a parameter to be coded which is generated in relation to the aforementioned elements. The prediction image generation unit 101 generates a prediction image by using these coding parameters.

The coding parameter determination unit 110 calculates an RD cost value indicating the magnitude of an amount of information and a coding error for each of the multiple sets. The RD cost value is, for example, the sum of an amount of code and the value obtained by multiplying a square error by a coefficient λ. The amount of code is an amount of information of the coded data Te obtained by performing entropy coding of a quantization error and a coding parameter. The square error is the square sum of prediction errors calculated by the subtraction unit 102. The coefficient λ is a real number greater than a preset zero. The coding parameter determination unit 110 selects a set of coding parameters of which the calculated cost value is a minimum value. The coding parameter determination unit 110 outputs the determined coding parameters to the parameter coder 111 and the prediction parameter derivation unit 120.

Further, a computer may be used to implement some of the image coding apparatus 11 and the image decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, the parameter coder 111, and the prediction parameter derivation unit 120. In that case, this configuration may be realized by recording a program for realizing such control functions on a computer-readable recording medium and causing a computer system to read and perform the program recorded on the recording medium. Note that the "computer system" mentioned here refers to a computer system built into either the image coding apparatus 11 or the image decoding apparatus 31 and is assumed to include an OS and hardware components such as a peripheral apparatus. In addition, the "computer-readable recording medium" refers to a portable medium such as a flexible disk, a magneto-optical disk, a ROM, and a CD-ROM, and a storage apparatus such as a hard disk built into the computer system. Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a certain period of time, such as a volatile memory included in the computer system functioning as a server or a client in such a case. In addition, the above-described program may be one for implementing some of the above-described functions, and also may be one capable of implementing the above-described functions in combination with a program already recorded in a computer system.

In addition, a part or all of the image coding apparatus 11 and the image decoding apparatus 31 in the embodiments described above may be implemented as an integrated circuit such as a Large Scale Integration (LSI). Function blocks of the image coding apparatus 11 and the image decoding apparatus 31 may be individually realized as processors, or some or all of the function blocks may be integrated into processors. In addition, the circuit integration technique is not limited to LSI, and implementation as a dedicated circuit or a multi-purpose processor may be adopted. In addition, in a case that a circuit integration technology that replaces LSI appears as the semiconductor technologies advance, an integrated circuit based on that technology may be used.

Although embodiments of the present invention have been described above in detail with reference to the drawings, the specific configurations thereof are not limited to those described above and various design changes or the like can be made without departing from the spirit of the invention.

NNR

Neural Network Coding and Representation (NNR) is an international standard for efficiently compressing a neural network (NN). Compressing a learned NN enables to enhance efficiency in storing and transmitting the NN.

In the following, an overview of coding and decoding processing of NNR will be described.

Figure 13:
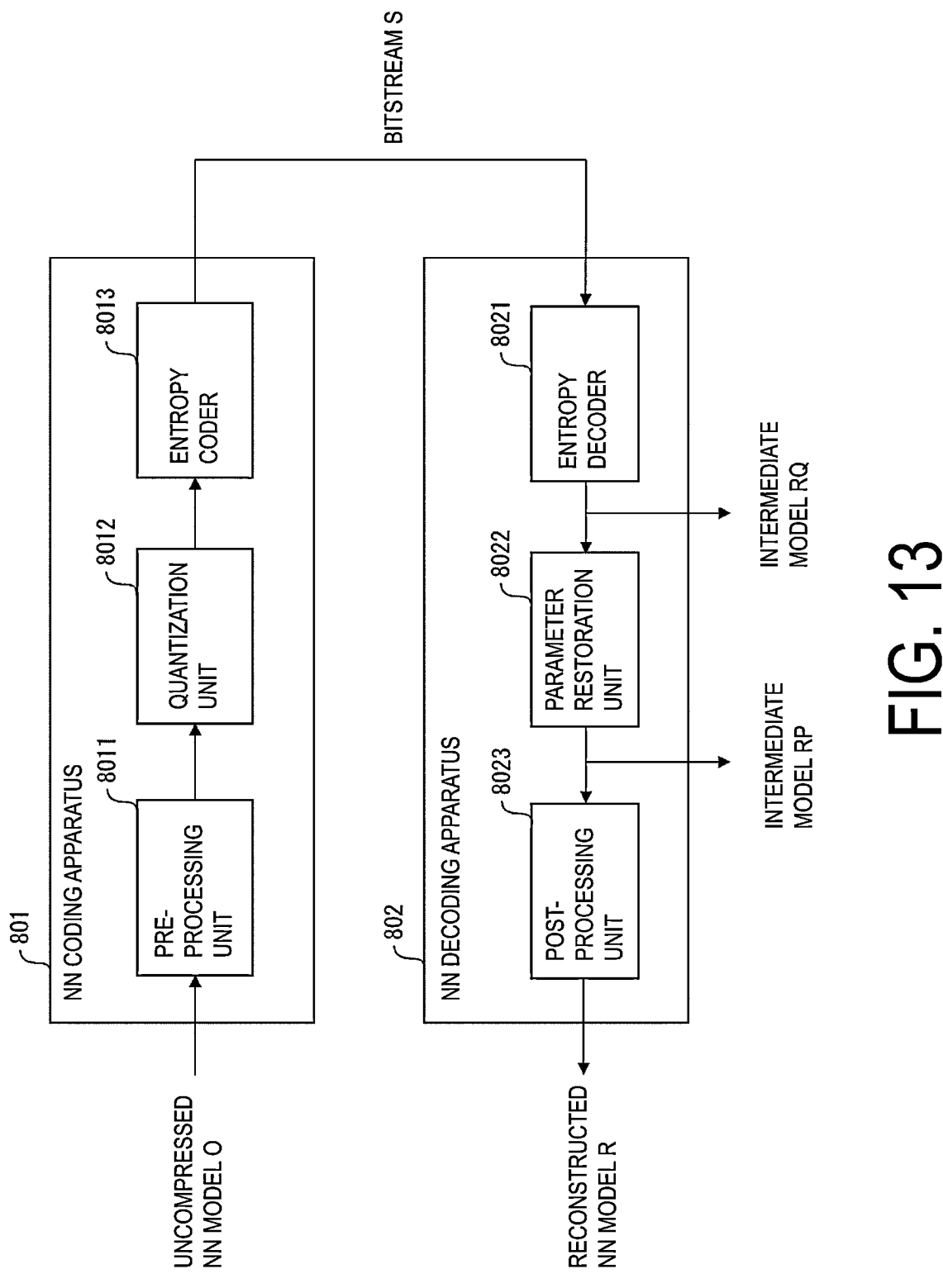
FIG. 13 is a diagram illustrating a coding apparatus and a decoding apparatus of NNR.

FIG. 13 is a diagram illustrating a coding apparatus and a decoding apparatus of NNR.

An NN coding apparatus 801 includes a pre-processing unit 8011, a quantization unit 8012, and an entropy coder 8013. The NN coding apparatus 801 inputs an uncompressed NN model O, performs quantization of the NN model O in the quantization unit 8012, and derives a quantized model Q. Before the quantization, the NN coding apparatus 801 may repeatedly apply parameter reduction methods in the pre-processing unit 8011, such as pruning and sparse representation. Subsequently, in the entropy coder 8013, entropy coding is applied to the quantized model Q, and a bitstream S for storing and transmitting the NN model is derived.

An NN decoding apparatus 802 includes an entropy decoder 8021, a parameter restoration unit 8022, and a post-processing unit 8023. The NN decoding apparatus 802 first inputs the transmitted bitstream S, and in the entropy decoder 8021, performs entropy decoding of S and derives an intermediate model RQ. In a case that an operating environment of the NN model supports inference using a quantization representation used in RQ, RQ may be output and used for the inference. Otherwise, parameters of RQ are restored to the original representation in the parameter restoration unit 8022, and an intermediate model RP is derived. In a case that a sparse tensor representation to be used can be processed in the operating environment of the NN model, RP may be output and used for the inference. Otherwise, a tensor different from the NN model O or a reconfiguration NN model R not including a structural representation is derived and output.

In the NNR standard, there are decoding schemes for numerical representation of specific NN parameters, such as integers and floating points.

With a decoding scheme NNR_PT_INT, a model including a parameter of an integer value is decoded. With a decoding scheme NNR_PT_FLOAT, NNR_PT_INT is enhanced, and a quantization step size delta is added. delta is multiplied by the integer value, and a scaled integer is thereby generated. delta is derived as follows, using a quantization parameter qp of an integer and a granularity parameter qp_density of delta.

$$mul = 2^{(qp\_density)} + (qp \& (2^{(qp\_density)} - 1))$$

$$delta = mul * 2^{((qp >> qp\_density) - qp\_density)}$$

Format of Learned NN

Representation of a learned NN includes two elements, i.e., topology representation such as the size of each layer and connection between the layers and parameter representation such as the weight and the bias.

The topology representation is covered by native formats such as TensorFlow and PyTorch; however, for the sake of enhancement of interoperability, there are exchange formats such as an Open Neural Network Exchange Format (ONNX) and a Neural Network Exchange Format (NNEF).

In the NNR standard, topology information nnr_topology_unit_payload is transmitted as a part of an NNR bitstream including a compressed parameter tensor. This allows for implementation of interoperation with topology information represented not only in an exchange format but also in a native format.

Post-Filter Purpose SEI

The post-filter purpose SEI indicates the purpose of the post-filter processing and describes input/output information corresponding to the purpose of the post-filter processing. FIG. 11 illustrates a syntax of the SEI.

First, InputChromaFormatIdc (ChromaFormatIdc) of an input image is defined as an input of the SET. The value of sps_chroma_format_idc of the coded data is assigned to this value.

The value of pfp_id indicates an identification number of post-filtering indicated by another mechanism. In the present embodiment, the identification number is associated with the NN filter SET. This SEI message is applied to the current decoded image and all subsequent decoded images in the output order until, in the current layer, a new Coded Layer Video Sequence (CLVS) is started or the bitstream is ended.

pfp_id includes an identification number that can be used for identifying the post-filter processing. The identification number takes a value from 0 to 220-1, and the value from 220 to 221-1 is reserved for future use.

pfp_purpose indicates the purpose of the post-filter processing identified by pfp_id. The value of pfp_purpose ranges from 0 to 232-2. Other values of pfp_purpose are reserved for future indication. Note that the decoder of the additional information ignores the post_filter_purpose SEI message including the reserved value of pfp_purpose.

A value of 0 for pfp_purpose indicates improvement in visual quality. In other words, this means application of post-filter processing for performing image restoration processing that does not involve image resolution conversion.

A value of 1 for pfp_purpose indicates the width or height of a cropped output image. In other words, this means application of post-filter processing accompanied by conversion of the resolution of the image.

In a case that the value of pfp_purpose is 1, the syntax elements pfp_pic_width_in_luma_samples and pfp_pic_height_in_luma_samples are present.

pfp_pic_width_in_luma_samples indicates the width of the luma pixel array of the image resulting from application, to the cropped output image, of the post-processing filter identified by pfp_id.

pfp_pic_height_in_luma_samples indicates the height of the luma pixel array of the image resulting from application, to the cropped output image, of the post-processing filter identified by pfp_id.

In the examples of NPL 1 and NPL 2, information regarding resolution conversion and inverse conversion accompanying the chroma format conversion cannot be described well. In this embodiment, the above problem is solved by clarifying input/output information.

In a case that the value of pfp_purpose is 2, syntax elements are present that indicate the color component to which the post-filter processing is applied and information regarding the chroma format of the output image. In other words, this means that the post-filter processing related to the chroma format conversion is applied.

In a case that the value of pfp_purpose is 2, the syntax elements pfp_component_idc and pfp_output_diff_chroma_format_idc are present.

pfp_component_idc indicates a color component to which post-filter processing is applied.

A value 0 for pfp_component_idc indicates that post-filtering is applied only to the luma component.

A value of 1 for pfp_component_idc indicates that post-filtering is applied to the two chroma components.

A value of 2 for pfp_component_idc indicates that post-filtering is applied to all three color components.

In a case that the syntax element pfp_component_idc is not present, the value of pfp_component_idc may be inferred as 2.

pfp_output_diff_chroma_format_idc is filter update information and indicates a difference value between the identification value of the chroma format output by the post-filter processing and the identification value of the chroma format of the input. Note that the value of pfp_output_diff_chroma_format_idc must be in the range of 0 to 2. The variable OutputChromaFormatIdc, which is the identification value of the chroma format output by the post-filter processing, is derived as follows:

$$OutputChromaFormatIdc=InputChromaFormatIdc+pfp\_output\_diff\_chroma\_format\_idc$$

Here, InputChromaFormatIdc is the value of sps_chroma_format_idc described in the SPS of the coded data, and is the identification value of the chroma format of the decoded image.

A value of 0 indicates monochrome (4:0:0), a value of 1 indicates 4:2:0, a value of 2 indicates 4:2:2, and a value of 3 indicates 4:4:4. In the variable OutputChromaFormatIdc which is the identification value of the chroma format output by the post-filter processing, similarly to the InputChromaFormatIdc, a value of 0 indicates monochrome (4:0:0), a value of 1 indicates 4:2:0, a value of 2 indicates 4:2:2, and a value 3 of indicates 4:4:4.

Note that, in the present embodiment, in order to derive OutputChromaFormatIdc, the value of OutputChromaFormatIdc is set to be equal to or larger than the value of InputChromaFormatIdc by using the difference value between the identification value of the chroma format to be output and the identification value of the chroma format of the input, but that, without the use of the difference value, OutputChromaFormatIdc may be directly used as a syntax element. In this case, the value of OutputChromaFormatIdc can advantageously be defined independently of the value of InputChromaFormatIdc. In this case, in a case that the syntax element OutputChromaFormatIdc is not present, the value of OutputChromaFormatIdc is inferred to be the same as the value of InputChromaFormatIdc.

In a case that the update information php_output_diff_chroma_format_idc is not present in the coded data, the NN filter unit 611 infers php_output_diff_chroma_format_idc to be 0. Accordingly, in a case that php_output_diff_chroma_format_idc is not present in the coded data, the NN filter unit 611 may perform setting as follows:

OutputChromaFormatIdc=ChromaFormatIdc

As described above, the video decoding apparatus is provided that includes the prediction image derivation unit that decodes a prediction image, and the residual decoder that decodes a residual, wherein, in a case that there is no filter update information, the header decoder 3020 infers the chroma format of the output related to the chroma subsampling by the chroma format of the input. This is effective in enabling update by accurate filtering processing even in a case that no filter update information is indicated.

The NN filter unit 611 derives a variable indicating the chroma sub-sampling of the output image as follows:

outSubWidthC=outSW=1, outSubHeightC=outSH=1 (OutputChromaFormatIdc==0)

outSubWidthC=outSW=2, outSubHeightC=outSH=2 (OutputChromaFormatIdc==1)

outSubWidthC=outSW=2, outSubHeightC=outSH=1 (OutputChromaFormatIdc==2)

outSubWidthC=outSW=1, outSubHeightC=outSH=1 (OutputChromaFormatIdc==3)

As described above, by defining the input component and the output format of the post-filter processing of the chroma format conversion, the input and output data of the post-filter processing of the chroma format conversion can be clarified.

Note that pfp_component_idc for indicating the color component to which the above-described post-filter processing is applied distinguishes between luminance and chrominance, but may simply indicate the number of components. Specifically, the following semantics may be used.

A value of 0 for pfp_component_idc indicates that post-filtering of one component is applied.

A value of 1 for pfp_component_idc indicates that post-filtering is applied to two components.

A value of 2 for pfp_component_idc indicates that post-filtering is applied to all three components.

The NN filter unit 611 may switch the NN model according to pfp_component_idc.

In the case of pfp_component_idc==0: the NN filter unit 611 selects an NN model for deriving a one-channel three dimensional tensor from a one-channel three dimensional tensor, and performs filter processing.

In the case of pfp_component_idc==1: the NN filter unit 611 selects an NN model for deriving a two-channel three dimensional tensor from a two-channel three dimensional tensor, and performs filter processing.

In the case of pfp_component_idc==2: the NN filter unit 611 selects an NN model for deriving a three-channel three dimensional tensor from a three-channel three dimensional tensor, and performs filter processing.

As described above, an appropriate NN model is selected in accordance with the color component to be applied, enabling a reduction in the amount of processing.

In accordance with pfp_component_idc, the NN filter unit 611 may derive nnrpf_input_format_idc in such a manner as to provide a one-channel NN model for one component, a two-channel NN model for two components, and a three-channel NN model for three components, as follows.

nnrpf_input_format_idc=0 (pfp_component_idc==0)

nnrpf_input_format_idc=1 (pfp_component_idc==1)

nnrpf_input_format_idc=2 (pfp_component_idc==2)

In other words, nnrpf_input_format_idc=pfp_component_idc

As another example, in accordance with pfp_component_idc, the NN filter unit 611 may derive nnrpf_input_format_idc in such a manner as to provide a one-channel NN model for one component, a two-channel NN model for two components, and a six-channel NN model for three components, as follows:

nnrpf_input_format_idc=0 (pfp_component_idc==0)

nnrpf_input_format_idc=1 (pfp_component_idc==1)

nnrpf_input_format_idc=3 (pfp_component_idc==2)

In other words, nnrpf_input_format_idc=pfp_component_idc<2 ?pfp_component_idc:3

As described above, the embodiment is effective in allowing an appropriate NN model tensor format to be selected in accordance with the color component to be applied.

As described above, the NN filter unit 611 may directly derive inputTensor in accordance with pfp_component_idc as described above. Alternatively, the NN filter unit 611 may switch between the value of the input image ComponentSample and the value of the NN output data outTensor in accordance with pfp_component_idc to derive the output image by the following processing.

In the case of pfp_component_idc==0 outSamplesL[x][y]=outTensor[0][y][x]

outSamplesCb[x*2/outSW][y*2/outSH]=ComponentSample[1][x*2/SW][y*2/SH]

outSamplesCr[x*2/outSW][y*2/outSH]=ComponentSample[2][x*2/SW][y*2/SH]

pfp_component_idc==1 outSamplesL[x][y]=ComponentSample [0][x]1[y]

outSamplesCb[x*2/outSW][y*2/outSH]=outTensor[0][x*2/SW][y*2/SH]

outSamplesCr[x*2/outSW][y*2/outSH]=outTensor[1][x*2/SW][y*2/SH]

pfp_component_idc==2 outSamplesL[x][y]=outTensor[0][x][y]

outSamplesCb[x*2/outSW][y*2/outSH]=outTensor[1][x*2/SW][y*2/SH]

outSamplesCr[x*2/outSW][y*2/outSH]=outTensor[2][x*2/SW][y*2/SH]

In the above-described example, the identification value of the chroma format output by the post-filter processing is indicated by a difference value from the identification value of the chroma format of the input, but may be directly described by a syntax element.

In the present embodiment, the post-filter purpose SEI is defined independently of the NN post-filter SEI to define the input and output of the post-filter processing. However, a similar syntax may be defined for the NN post-filter SEI, and the problem can be similarly solved.

To describe the present embodiment with reference to FIG. 1, the video decoding apparatus includes the image decoding apparatus that decodes coded data obtained by coding an image, the resolution inverse conversion apparatus that converts the resolution of the image decoded by the image decoding apparatus, and the inverse conversion information decoding apparatus that decodes color component information to be input to the resolution inverse conversion apparatus and chroma format information to be output.

The video coding apparatus is also provided that includes the image coding apparatus that codes an image, and the inverse conversion information coding apparatus that codes color component information to be input to the resolution inverse conversion apparatus conversing the resolution of the coded image, and chroma format information to be output.

An embodiment of the present invention is not limited to the embodiments described above and various changes can be made within the scope indicated by the claims. That is, embodiments obtained by combining technical means appropriately modified within the scope indicated by the claims are also included in the technical scope of the present invention.

INDUSTRIAL APPLICABILITY

The embodiments of the present invention can be preferably applied to a video decoding apparatus for decoding coded data in which image data is coded, and a video coding apparatus for generating coded data in which image data is coded. In addition, the embodiments of the present invention can be preferably applied to a data structure of coded data generated by the video coding apparatus and referred to by the video decoding apparatus.

CROSS-REFERENCE OF RELATED APPLICATION

The present application claims priority of JP 2022-004115, filed on Jan. 14, 2022, and all the contents thereof are included herein by the reference.

REFERENCE SIGNS LIST

1 Video transmission system
30 Video decoding apparatus
31 Image decoding apparatus
301 Entropy decoder
302 Parameter decoder
303 Inter prediction parameter derivation unit
304 Intra prediction parameter derivation unit
305, 107 Loop filter
306, 109 Reference picture memory
307, 108 Prediction parameter memory
308, 101 Prediction image generation unit
309 Inter prediction image generation unit
310 Intra prediction image generation unit
311, 105 Inverse quantization and inverse transform processing unit
312, 106 Addition unit
320 Prediction parameter derivation unit
10 Video coding apparatus

11 Image coding apparatus
102 Subtraction unit
103 Transform and quantization unit
104 Entropy coder
110 Coding parameter determination unit
111 Parameter coder
112 Inter prediction parameter coder
113 Intra prediction parameter coder
120 Prediction parameter derivation unit
71 Inverse conversion information generation apparatus
81 Inverse conversion information coding apparatus
91 Inverse conversion information decoding apparatus
611 NN filter unit

The invention claimed is:

1. A video decoding apparatus comprising:

an image decoding circuit configured to decode an image from coded data;

a header decoding circuit configured to decode an input image information, indicating a format of an input tensor of a neural network model, and an additional input information; and a neural network filter circuit configured to (1) derive a part of the input tensor from an image by using the input image information, (2) add an additional information to another part of the input tensor by using the additional input information, (3) derive an output tensor by performing a post-filter processing of a neural network by using the input tensor, and (4) derive a filtered image from the output tensor, wherein the additional information is derived by using a filter strength and a bit depth.

\* \* \* \* \*